US012763605B2

(12) United States Patent
Takahashi et al.

(10) Patent No.: US 12,763,605 B2
(45) Date of Patent: Oct. 13, 2026

(54) CONTACTLESS POWER SUPPLY SYSTEM AND POWER RECEPTION APPARATUS

(71) Applicant: DENSO CORPORATION, Kariya-city (JP)

(72) Inventors: Masaya Takahashi, Kariya-city (JP); Mitsuru Shibanuma, Kariya-city (JP); Kazuyuki Kato, Kariya-city (JP); Yusei Nakayashiki, Kariya-city (JP); Eisuke Takahashi, Kariya-city (JP); Nobuhisa Yamaguchi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 569 days.

(21) Appl. No.: 18/235,168

(22) Filed: Aug. 17, 2023

(65) Prior Publication Data

US 2023/0396100 A1 Dec. 7, 2023

Related U.S. Application Data

(63) Continuation of application No. PCT/JP2022/003783, filed on Feb. 1, 2022.

(30) Foreign Application Priority Data

Feb. 19, 2021 (JP) ................................ 2021-024832
Jan. 27, 2022 (JP) ................................ 2022-010961

(51) Int. Cl.
*H02J 50/12* (2016.01)
*H02J 7/02* (2016.01)
(Continued)

(52) U.S. Cl.
CPC ................ *H02J 50/12* (2016.02); *H02J 7/80* (2026.01); *H02J 7/933* (2026.01); *H02J 50/402* (2020.01); *H02J 50/70* (2016.02)

(58) Field of Classification Search
CPC ............. H02J 50/12; H02J 50/402; H02J 7/02
(Continued)

(56) References Cited

U.S. PATENT DOCUMENTS

2005/0288739 A1 12/2005 Hassler et al.
2012/0038220 A1 2/2012 Kim et al.
(Continued)

FOREIGN PATENT DOCUMENTS

JP 2010-088178 A 4/2010
JP 5239706 B2 7/2013
(Continued)

OTHER PUBLICATIONS

Smeets et al., "Integration of an Inductive Position Sensor and a Contactless Energy Transfer System," Electrical Machines (ICEM), 2012, p. 1751-1756.

*Primary Examiner* — Toan C Ly
(74) *Attorney, Agent, or Firm* — Oliff PLC

(57) ABSTRACT

A primary-side resonant circuit of a power transmission apparatus has an impedance varying element that increases, when supply of electric power is stopped, an input impedance of the primary-side resonant circuit so as to have predetermined standby current flowing through a primary-side coil. A power reception apparatus includes a magnetic flux amplifier circuit configured to amplify magnetic flux generated by the standby current flowing through the primary-side coil of the primary-side resonant circuit. The power transmission apparatus further includes a primary-side detection circuit configured to detect a change in the voltage of the primary-side coil, a change in electric current flowing through the primary-side coil or a change in a magnetic field in the vicinity of the primary-side coil; each of the changes is caused by the magnetic flux amplified by the magnetic flux amplifier circuit.

31 Claims, 15 Drawing Sheets

(51) Int. Cl.
*H02J 7/80* (2026.01)
*H02J 7/90* (2026.01)
*H02J 50/40* (2016.01)
*H02J 50/70* (2016.01)

(58) Field of Classification Search
USPC .......................................................... 320/108
See application file for complete search history.

(56) References Cited

U.S. PATENT DOCUMENTS

| | | | |
|---|---|---|---|
| 2016/0226296 | A1 | 8/2016 | Bae et al. |
| 2018/0090996 | A1 | 3/2018 | Kitamura et al. |
| 2018/0262049 | A1 | 9/2018 | Ikefuji et al. |

FOREIGN PATENT DOCUMENTS

| | | | |
|---|---|---|---|
| JP | 2015-65756 | A | 4/2015 |
| WO | 2020/122017 | A1 | 6/2020 |

CONTACTLESS POWER SUPPLY SYSTEM AND POWER RECEPTION APPARATUS

CROSS-REFERENCE TO RELATED APPLICATIONS

The present application is a continuation application of International Application No. PCT/JP2022/003783 filed on Feb. 1, 2022, which is based on and claims priority from both Japanese Patent Application No. 2021-024832 filed on Feb. 19, 2021 and Japanese Patent Application No. 2022-010%1 filed on Jan. 27, 2022. The entire contents of these applications are incorporated by reference into the present application.

BACKGROUND

1 Technical Field

The present disclosure relates to contactless power supply systems and power reception apparatuses.

2 Description of Related Art

Various contactless power supply systems have been proposed in which electric power is supplied from a primary side to a secondary side in a contactless manner by induction; the primary side is a power transmission side whereas the secondary side is a power reception side. For example, in Japanese Unexamined Patent Application Publication No. JP2010088178A, there is disclosed a configuration of performing, by a handshake through two-way wireless communication, both positioning between a power transmission apparatus and a power reception apparatus and a power supply start procedure between the power transmission apparatus and the power reception apparatus and thereby automatically performing supply of electric power from the power transmission apparatus to the power reception apparatus.

SUMMARY

However, a handshake through two-way wireless communication tends to require time for the procedure until the supply of electric power actually starts; thus, there is a problem in terms of fast responsiveness. This problem becomes remarkable particularly in, for example, a system for supplying electric power to a traveling vehicle. Moreover, the execution of a handshake through two-way wireless communication requires equipment employing circuits for performing complicated signal processing; thus, simplification of such equipment is desired.

The present disclosure has been accomplished to in view of the problem.

According to one aspect of the present disclosure, there is provided a contactless power supply system in which supply of electric power from a power transmission apparatus to a power reception apparatus is performed in a contactless manner. The contactless power supply system includes the power transmission apparatus and the power reception apparatus. The power transmission apparatus includes: a primary-side resonant circuit having a primary-side coil for power transmission and a primary-side capacitor; and an AC power supply apparatus configured to supply AC power of a predetermined operating frequency to the primary-side resonant circuit. The power reception apparatus includes: a secondary-side resonant circuit having a secondary-side coil for power reception, which is to be magnetically coupled with the primary-side coil, and a secondary-side capacitor; and a load apparatus configured to use electric power outputted from the secondary-side resonant circuit. The primary-side resonant circuit has an impedance varying element that increases, when the supply of electric power is stopped, an input impedance of the primary-side resonant circuit so as to have predetermined standby current flowing through the primary-side coil. The power reception apparatus further includes a magnetic flux amplifier circuit configured to amplify magnetic flux generated by the standby current flowing through the primary-side coil. The power transmission apparatus further includes a primary-side detection circuit configured to detect a change in a voltage of the primary-side coil, a change in electric current flowing through the primary-side coil or a change in a magnetic field in the vicinity of the primary-side coil; each of the change in the voltage, the change in the electric current and the change in the magnetic field is caused by the magnetic flux amplified by the magnetic flux amplifier circuit. In the contactless power supply system according to this aspect, the presence of the power reception apparatus can be detected by the primary-side detection circuit in the power transmission apparatus. Consequently, supply of electric power from the power transmission apparatus to the power reception apparatus can be automatically performed without performing a handshake through communication between the power transmission side and the power reception side.

According to another aspect of the present disclosure, there is provided a contactless power supply system in which supply of electric power from a power transmission apparatus to a power reception apparatus is performed in a contactless manner. The contactless power supply system includes the power transmission apparatus and the power reception apparatus. The power transmission apparatus includes: a primary-side resonant circuit having a primary-side coil for power transmission and a primary-side capacitor; an AC power supply apparatus configured to supply AC power of a predetermined operating frequency to the primary-side resonant circuit; and a power-transmission-apparatus detection section provided at the primary-side coil or near the primary-side coil. The power reception apparatus includes: a secondary-side resonant circuit having a secondary-side coil for power reception, which is to be magnetically coupled with the primary-side coil, and a secondary-side capacitor; a load apparatus configured to use electric power outputted from the secondary-side resonant circuit; an activation circuit having an activation coil and a pulse generation circuit configured to supply AC current of the operating frequency to the activation coil; and a power-transmission-apparatus detecting unit configured to detect the power-transmission-apparatus detection section. In response to detection of the power-transmission-apparatus detection section by the power-transmission-apparatus detecting unit, the activation circuit supplies the AC current from the pulse generation circuit to the activation coil. The power transmission apparatus further includes a primary-side detection circuit configured to detect a change in a voltage of the primary-side coil, a change in electric current flowing through the primary-side coil or a change in a magnetic field in the vicinity of the primary-side coil; each of the change in the voltage, the change in the electric current and the change in the magnetic field is caused by magnetic flux generated by the activation coil with the supplied AC current. In the contactless power supply system according to this aspect, the presence of the power reception apparatus can be detected by the primary-side detection circuit without having standby current flow through the power transmission apparatus. Consequently, supply of electric power from the power transmission apparatus to the power reception apparatus can be automatically performed without performing a handshake through communication between the power transmission side and the power reception side.

According to yet another aspect of the present disclosure, there is provided a power reception apparatus configured to receive, in a contactless manner, electric power transmitted from a power transmission apparatus. The power reception apparatus includes: a secondary-side resonant circuit that includes a secondary-side coil for power reception, which is to be magnetically coupled with a primary-side coil for power transmission included in the power transmission apparatus, and a secondary-side capacitor; a load apparatus configured to use electric power outputted from the secondary-side resonant circuit; and a magnetic flux amplifier circuit configured to amplify magnetic flux generated by predetermined standby current flowing through the primary-side coil. With the power reception apparatus according to this aspect, a primary-side detection circuit of the power transmission apparatus can detect the presence of the power reception apparatus. Consequently, supply of electric power from the power transmission apparatus to the power reception apparatus can be automatically performed without performing a handshake through communication between the power transmission side and the power reception side.

According to still another aspect of the present disclosure, there is provided a power reception apparatus configured to receive, in a contactless manner, electric power transmitted from a power transmission apparatus. The power reception apparatus includes: a secondary-side resonant circuit that includes a secondary-side coil for power reception, which is to be magnetically coupled with a primary-side coil for power transmission included in the power transmission apparatus, and a secondary-side capacitor; a load apparatus configured to use electric power outputted from the secondary-side resonant circuit; an activation circuit that includes an activation coil and a pulse generation circuit configured to supply AC current of a predetermined operating frequency to the activation coil; and a power-transmission-apparatus detecting unit configured to (i) detect a power-transmission-apparatus detection section provided at the primary-side coil or near the primary-side coil and (ii) cause, upon detecting the power-transmission-apparatus detection section, the pulse generation circuit to supply the AC current to the activation coil. With the power reception apparatus according to this aspect, a primary-side detection circuit of the power transmission apparatus can detect the presence of the power reception apparatus without having standby current flow through the power transmission apparatus. Consequently, supply of electric power from the power transmission apparatus to the power reception apparatus can be automatically performed without performing a handshake through communication between the power transmission side and the power reception side.

DESCRIPTION OF EMBODIMENTS

Figure 1:
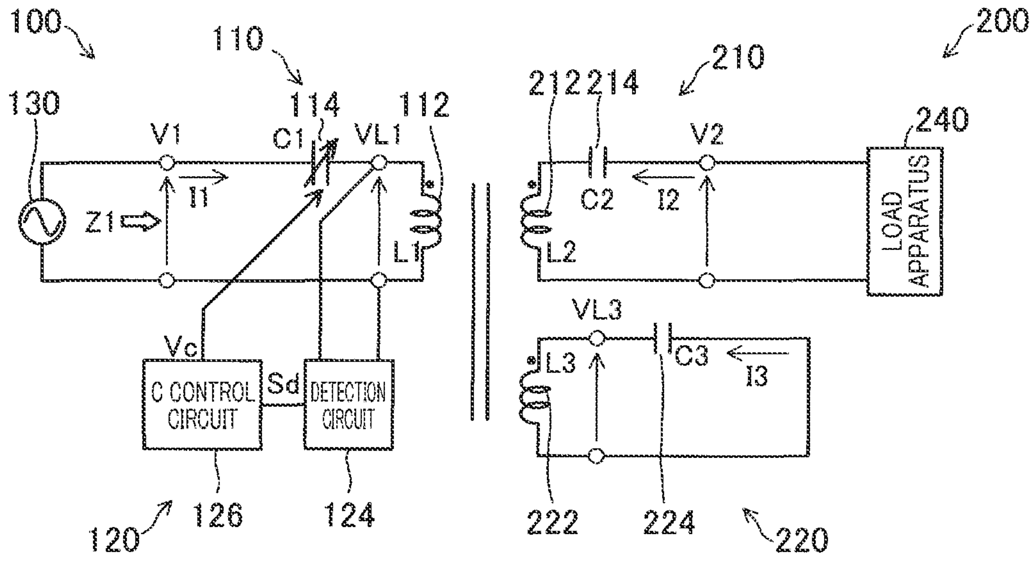
FIG. 1 is a schematic configuration diagram of a contactless power supply system according to a first embodiment.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

As shown in FIG. 1, a contactless power supply system according to the first embodiment includes a power transmission apparatus 100, and a power reception apparatus 200 to which electric power is supplied from the power transmission apparatus 100 in a contactless manner.

The power transmission apparatus 100 includes a primary-side resonant circuit 110, a primary-side detection circuit 120 and an AC power supply apparatus 130. The primary-side resonant circuit 110 is a circuit that performs supply of electric power to the power reception apparatus 200 by induction through resonance.

The primary-side resonant circuit 110 includes a primary-side coil 112, and a primary-side capacitor 114 connected in series with the primary-side coil 112. The primary-side capacitor 114 is a resonant capacitor for resonating electric power applied to the primary-side coil 112. The primary-side capacitor 114 is implemented by a variable capacitor whose capacitance is variable. Specifically, the primary-side capacitor 114 is implemented by a variable capacitor whose capacitance C1 changes according to a control input applied thereto, more particularly according to a control voltage Vc applied thereto in the present embodiment. The primary-side resonant circuit 110 is a circuit that transmits AC power, in a resonant coupling state where the primary-side coil 112 for power transmission and a secondary-side coil 212 for power reception are magnetically coupled with each other, to the secondary-side coil 212. As will be described later, the secondary-side coil 212 is included in a secondary-side resonant circuit 210 of the power reception apparatus 200.

The AC power supply apparatus 130 is an apparatus that applies AC power having a predetermined operating frequency to the primary-side resonant circuit 110. Specifically, the AC power supply apparatus 130 is configured as an apparatus that includes a power supply that converts AC power from an external power supply into DC power, and an inverter that converts the DC power supplied from the power supply into the AC power having the operating frequency. In addition, a filter may be provided on an output side of the inverter. Hereinafter, the AC voltage applied to the primary-side resonant circuit 110 by the AC power supply apparatus 130 will be denoted by V1; the AC current flowing through the primary-side resonant circuit 110 will be denoted by I1; the operating frequency will be denoted by f0; and the operating angular frequency will be denoted by ω0 ($=2\pi \cdot f0$).

The primary-side detection circuit 120 includes a detection circuit 124 and a C control circuit 126. The detection circuit 124 detects whether there is an increase in a primary-side coil voltage VL1 generated between terminals of the primary-side coil 112, thereby detecting whether there is the power reception apparatus 200 in a state capable of receiving electric power from the power transmission apparatus 100. In addition, an increase in the primary-side coil voltage VL1 is generated by a magnetic flux amplifier circuit 220 which will be described later. The C control circuit 126 outputs the control voltage Vc according to a detection signal Sd, thereby controlling the capacitance C1 of the primary-side capacitor 114. In addition, operation of the primary-side detection circuit 120 will be explained later together with operation of the magnetic flux amplifier circuit 220.

In the case where the detection signal Sd is in an active state indicating "detection", the capacitance C1 is set to a value such that the input impedance Z1 (i.e., V1/I1) of the primary-side resonant circuit 110 becomes low and thus high coil current for electric power supply will flow through the primary-side coil 112. This setting is performed by setting the control voltage Vc corresponding to the capacitance C1 for electric power supply to be the control input of the primary-side capacitor 114. On the other hand, in the case where the detection signal Sd is in an inactive state indicating "non-detection", the capacitance C1 is set to a value such that the input impedance Z1 of the primary-side resonant circuit 110 becomes high and thus low coil current for standby will flow through the primary-side coil 112. This setting is performed by setting the control voltage Vc corresponding to the capacitance C1 for standby to be the control input of the primary-side capacitor 114. Hereinafter, the case where the detection signal Sd is in the active state will be referred to as "when supplying electric power"; and the case where the detection signal Sd is in the inactive state will be referred to as "when not supplying electric power". Moreover, the high coil current for electric power supply will be referred to as the "power supply current"; and the low coil current for standby will be referred to as the "standby current".

The input impedance Z1 can be simply expressed by $Z1=j[\omega 0 \cdot L1-1/(\omega 0 \cdot C1)]$. Here, L1 is the self-inductance of the primary-side coil 112. Therefore, to reduce the input impedance Z1, the capacitance C1 may be set so that the absolute value of $[\omega 0 \cdot L1-1/(\omega 0 \cdot C1)]$ becomes a predetermined value. In contrast, to increase the input impedance Z1, the capacitance C1 may be set to be lower than in the case of reducing the input impedance Z1, so that the input impedance Z1 has a value corresponding to a predetermined value of the standby current. From the above, in the case of reducing the input impedance Z1, the capacitance C1 is set to the capacitance for electric power supply; otherwise, in the case of increasing the input impedance Z1, the capacitance C1 is set to the capacitance for standby. In addition, as can be seen from the above explanation, the primary-side capacitor 114 corresponds to an "impedance varying element" that varies the input impedance Z1.

The power reception apparatus 200 may be installed in various apparatuses that operate on electric power, such as electronic devices and electric vehicles. The power reception apparatus 200 includes a secondary-side resonant circuit 210, a magnetic flux amplifier circuit 220 and a load apparatus 240.

Similar to the primary-side resonant circuit 110, the secondary-side resonant circuit 210 has a secondary-side coil 212 and a secondary-side capacitor 214 connected in series with each other; the secondary-side capacitor 214 is a resonant capacitor. The secondary-side resonant circuit 210 is a circuit that obtains AC power induced in the secondary-side coil 212 in the resonant coupling state where the secondary-side coil 212 and the primary-side coil 112 are magnetically coupled with each other.

The load apparatus 240 is an apparatus that uses the AC power induced in the secondary-side resonant circuit 210. For example, the load apparatus 240 may be an apparatus that receives the AC power obtained by the secondary-side resonant circuit 210 and charges a battery with the received AC power. Specifically, the load apparatus 240 may include, for example, a power reception circuit and a battery. Further, the power reception circuit may include, for example, a rectifier circuit that converts the AC power into DC power that can be supplied to the battery, and a DC-to-DC converter if necessary. The electric power charged in the battery may be used as an electric power in the apparatus where the power reception apparatus 200 is installed. It should be noted that the load apparatus 240 is not limited to the apparatus that includes the power reception circuit and the battery, but may be implemented by various apparatuses that can use the AC power outputted from the secondary-side resonant circuit 210.

The magnetic flux amplifier circuit 220 is configured with a closed circuit in which an amplification coil 222 and an amplification capacitor 224 are connected in series with each other. The capacitance C3 of the amplification capacitor 224 is set to be $C3=1/(\omega 0^2 \cdot L3)$ with respect to the self-inductance L3 of the amplification coil 222, so that the operating frequency f0 becomes the resonant frequency of the magnetic flux amplifier circuit 220. In addition, operation of the magnetic flux amplifier circuit 220 will be explained later together with operation of the primary-side detection circuit 120. The amplification coil 222 is fixedly arranged at a position where it is in a constant coupling state with the secondary-side coil 212.

The capacitance C1 of the primary-side capacitor 114 when supplying electric power is set to be $C1=1/(\omega 0^2 \cdot L1)$ with respect to the self-inductance L1 of the primary-side coil 112, so that the operating frequency f0 becomes the resonant frequency of the primary-side resonant circuit 110. Moreover, the capacitance C1 when supplying electric power may alternatively be set to be $C1=1/[\omega 0^2 \cdot L1(1-k13 \cdot k12/k32)]$ taking into account the mutual coupling coefficients of the primary-side coil 112, the secondary-side coil 212 and the amplification coil 222. Here, knm represents the coupling coefficient between the nth-order-side coil and the mth-order-side coil. Otherwise, the capacitance C1 when supplying electric power may alternatively be set so that the xth-order (x is a positive number greater than or equal to 2) harmonic frequency of the operating frequency f0 becomes the resonant frequency of the primary-side resonant circuit 110. That is, the capacitance C1 when supplying electric power may be set, under various predetermined setting conditions and based on the self-inductance L1 of the primary-side coil 12, the operating frequency f0 (or the operating angular frequency ω0), the coupling coefficients knm and the like, so that the AC power having the operating frequency f0 can be efficiently transferred between the primary-side resonant circuit 110 and the secondary-side resonant circuit 210.

On the other hand, the capacitance C1 when not supplying electric power is set to a value sufficiently less than the value of the capacitance C1 when supplying electric power, so that the input impedance Z1 has the value corresponding to the predetermined value of the standby current.

Similar to the capacitance C1 when supplying electric power, the capacitance C2 of the secondary-side capacitor 214 is set to be $C2=1/(\omega 0^2 \cdot L2)$ with respect to the self-inductance L2 of the secondary-side coil 212, so that the operating frequency f0 becomes the resonant frequency of the secondary-side resonant circuit 210. Moreover, the capacitance C2 may alternatively be set to be $C2=1/[\omega 0^2 \cdot L2(1-k32 \cdot k12/k13)]$ taking into account the mutual coupling coefficients of the primary-side coil 112, the secondary-side coil 212 and the amplification coil 222. Otherwise, the capacitance C2 may alternatively be set so that the xth-order harmonic frequency of the operating frequency f0 becomes the resonant frequency of the secondary-side resonant circuit 210. That is, the capacitance C2 may be set, under various predetermined setting conditions and based on the self-inductance L2 of the secondary-side coil 212, the operating frequency f0 (or the operating angular frequency ω0), the coupling coefficients knm and the like, so that the AC power having the operating frequency f0 can be efficiently transferred between the primary-side resonant circuit 110 and the secondary-side resonant circuit 210.

It should be noted that in FIG. 1, two parallel lines indicate a state in which electric power can be supplied from the power transmission apparatus 100 to the power reception apparatus 200, i.e., a state in which the secondary-side coil 212 on the power reception side and the amplification coil 222 of the magnetic flux amplifier circuit 220 are arranged so as to be magnetically coupled with the primary-side coil 112 on the power transmission side.

Hereinafter, operations of the magnetic flux amplifier circuit 220 and the primary-side detection circuit 120 will be described. In the power transmission apparatus 100, first, it is assumed that the capacitance C1 of the primary-side capacitor 114 is set to a state when not supplying electric power. In this case, the AC voltage V1 is applied, by the AC power supply apparatus 130, between the terminals of the primary-side coil 112; thus magnetic flux corresponding to the AC standby current flowing through the primary-side coil 112 is generated.

When the power reception apparatus 200 approaches the power transmission apparatus 10 in the above-described state and thus magnetic coupling is established between the amplification coil 222 of the magnetic flux amplifier circuit 220 and the primary-side coil 112, the amplification coil 222 of the magnetic flux amplifier circuit 220 generates induced magnetic flux according to the increase in the degree of the coupling. The induced magnetic flux increases magnetic flux crossing the primary-side coil 112. That is, the magnetic flux amplifier circuit 220 substantially amplifies the magnetic flux in the vicinity of the primary-side coil 112, thereby enhancing the magnetic field.

Figure 2:
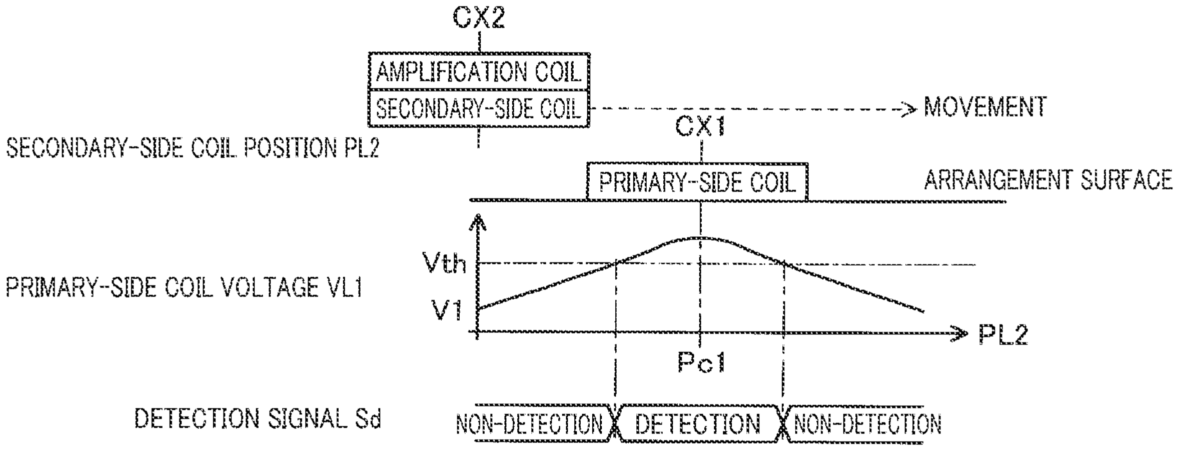
FIG. 2 is an explanatory diagram illustrating operation of a primary-side detection circuit.

Accordingly, as shown in FIG. 2, the coil voltage (i.e., the primary-side coil voltage) VL1 between the terminals of the primary-side coil 112 increases as the position of a central axis CX2 of the secondary-side coil 212 on the power reception side becomes closer to the position Pc1 of a central axis CX1 of the primary-side coil 112 on an arrangement surface, and decreases as the position of the central axis CX2 of the secondary-side coil 212 becomes farther from the position Pc1 of the central axis CX1 of the primary-side coil 112.

Therefore, in the primary-side detection circuit 120 (see FIG. 1), the detection signal Sd is switched from the inactive state to the active state in repose to detection by the detection circuit 124 of an increase in the primary-side coil voltage VL1 to a given value or more, e.g., an increase in the detected value of the primary-side coil voltage VL1 to a threshold value Vth or more.

In particular, in the case of the magnetic flux amplifier circuit 220 being implemented by a short-circuited resonant circuit whose resonant frequency is set to the operating frequency f0, if the Q factor of the short-circuited resonant circuit is sufficiently high, the primary-side coil voltage VL1 can be expressed by $VL1=(k13^2 \cdot Q3)V1$. That is, the primary-side coil voltage VL1 can be $[k13^2 \cdot Q3]$ times the voltage V1 applied by the AC power supply apparatus 130. Here, Q3 is the Q factor of the short-circuited resonant circuit; and Q3 can be expressed by $Q3=\omega 0 \cdot L3/r3$, where r3 is the winding resistance of the amplification coil 222.

Consequently, the increase in the primary-side coil voltage VL1 can be amplified, thereby improving the stability of the detection thereof.

Hence, the power transmission apparatus 100 can detect, without performing communication with the power reception apparatus 200, the fact that the secondary-side coil 212. i.e., the power reception apparatus 200 is in a state capable of receiving electric power from the power transmission apparatus 100.

Moreover, as described above, when the detection signal Sd is switched from the inactive state to the active state, the primary-side detection circuit 120 can set, by the C control circuit 126, the capacitance C1 of the primary-side capacitor 114 to a state when supplying electric power. In contrast, when the detection signal Sd is switched from the active state to the inactive state, the primary-side detection circuit 120 can set, by the C control circuit 126, the capacitance C1 to the state when not supplying electric power.

Hence, supply of electric power from the power transmission apparatus 100 to the power reception apparatus 200 can be automatically performed without performing a handshake through communication between the power transmission apparatus 100 and the power reception apparatus 200. Moreover, the speed of the detection of the presence or absence of the power reception apparatus 200 at the power transmission apparatus 100 depends on the responsiveness of the circuits constituting the power transmission apparatus 100 and the power reception apparatus 200; and the responsiveness of the circuits is faster than that of a handshake through communication. Therefore, the automatic supply of electric power from the power transmission apparatus 100 to the power reception apparatus 200 can be started faster than in the case of performing a handshake through communication.

Figure 3A:
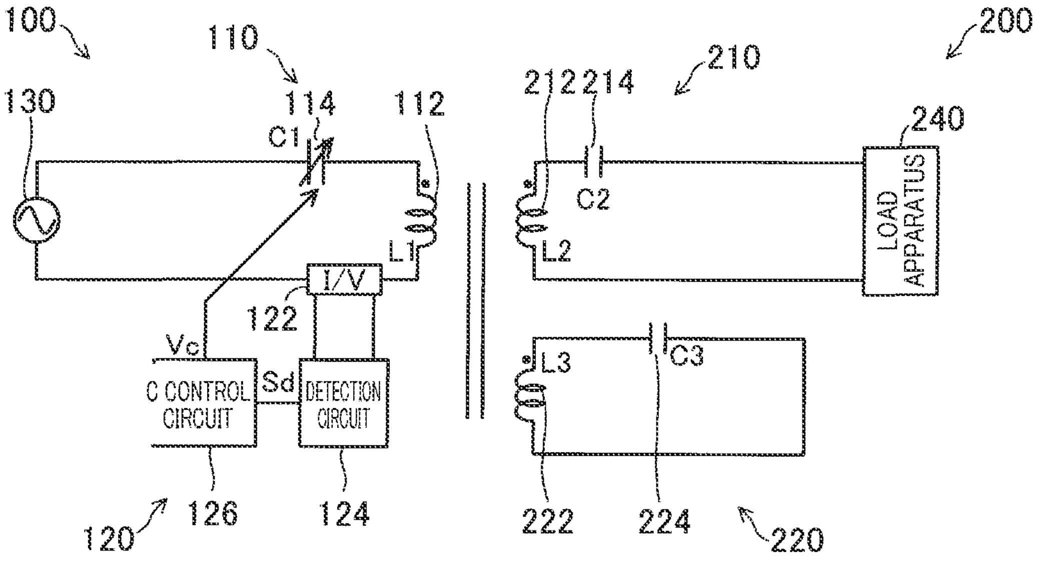
FIG. 3A is an explanatory diagram showing a modification of the primary-side detection circuit.

In addition, although the primary-side detection circuit 120 shown in FIG. 1 is configured to detect the change in the primary-side coil voltage VL1, the present disclosure is not limited to this configuration. For example, the coil current flowing through the primary-side coil 112 also changes in the same manner as the primary-side coil voltage VL1. Therefore, as shown in FIG. 3A, a current detection element 122, such as a current sensor, may be employed to detect the change in the coil current flowing through the primary-side coil 112.

Figure 3B:
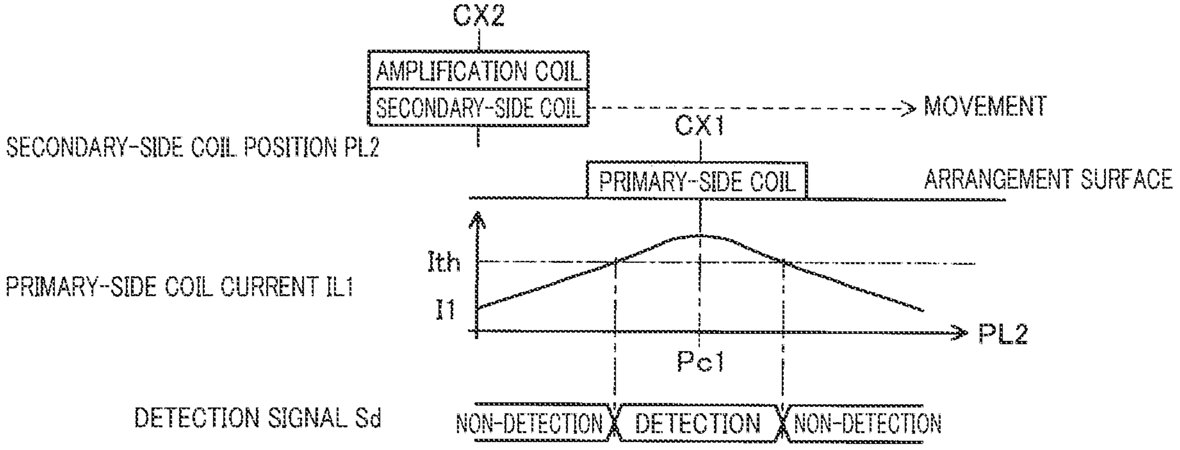
FIG. 3B is an explanatory diagram illustrating operation of the primary-side detection circuit according to the modification shown in FIG. 3A.

In this case, as shown in FIG. 3B, the coil current IL1 flowing through the primary-side coil 112 increases as the position of the central axis CX2 of the secondary-side coil 212 on the power reception side becomes closer to the position Pc1 of the central axis CX1 of the primary-side coil 112 on the arrangement surface, and decreases as the position of the central axis CX2 of the secondary-side coil 212 becomes farther from the position Pc1 of the central axis CX1 of the primary-side coil 112. In the primary-side detection circuit 120, the detection signal Sd is switched from the inactive state to the active state in response to detection by the detection circuit 124 of the fact that the coil current IL1 has become higher than or equal to a threshold value Ith. In this modification of the contactless power supply system as well, the power transmission apparatus 100 can detect, without performing communication with the power reception apparatus 200, the fact that the power reception apparatus 200 is in a state capable of receiving electric power from the power transmission apparatus 100. Consequently, supply of electric power from the power transmission apparatus 100 to the power reception apparatus 200 can be automatically performed without performing a handshake through communication between the power transmission apparatus 100 and the power reception apparatus 200.

Figure 4A:
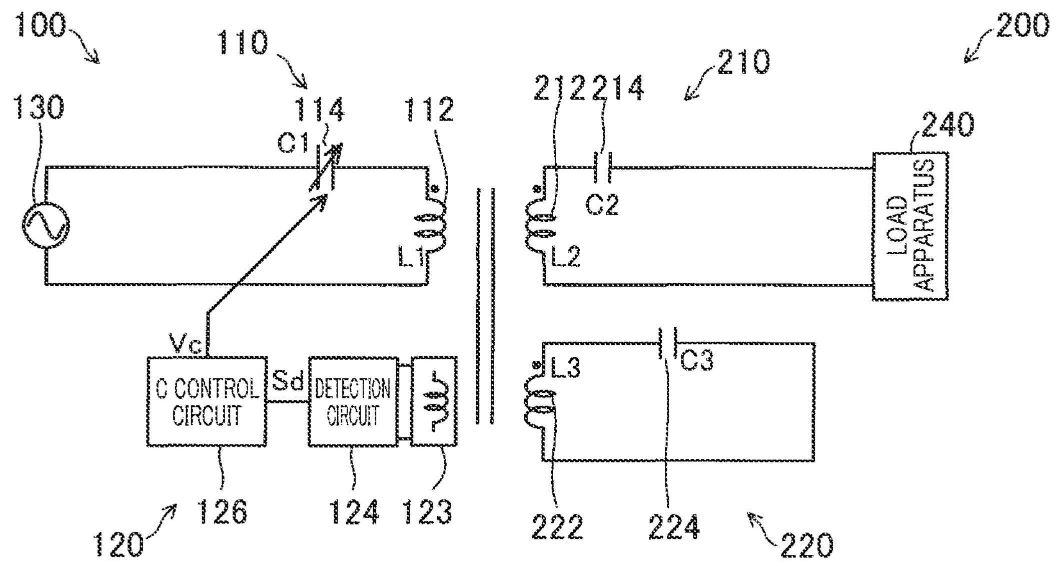
FIG. 4A is an explanatory diagram showing another modification of the primary-side detection circuit.

Otherwise, as shown in FIG. 4A, a magnetic flux detection element 123, such as a magnetic sensor or a coil, may be employed to detect the magnetic field (or magnetic flux) in the vicinity of the primary-side coil 112 which is changed by the magnetic flux amplifier circuit 220. It should be noted that the modifications of the detection target in the primary-side detection circuit 120, which are described with reference to FIGS. 3A to 4B, are also similarly applicable to the subsequent embodiments.

Figure 4B:
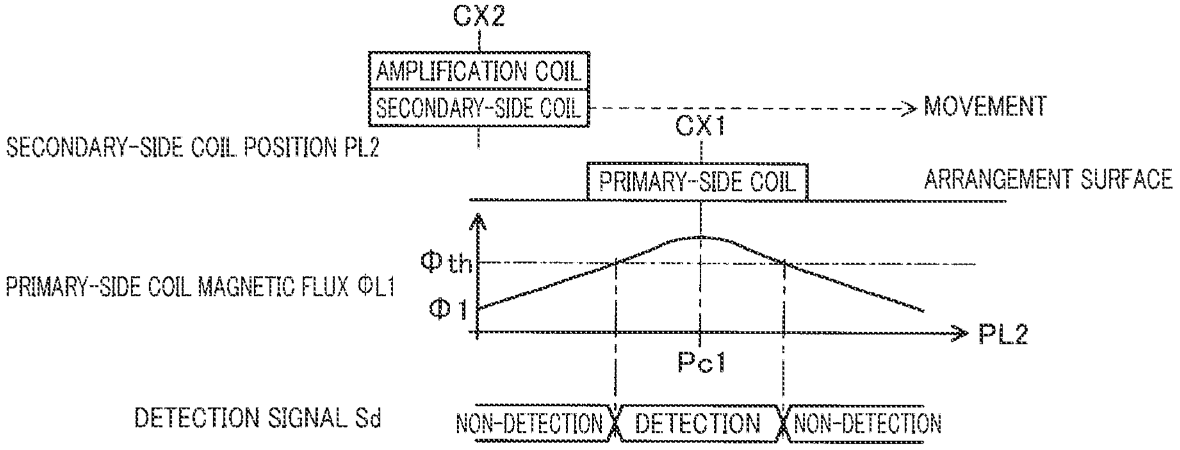
FIG. 4B is an explanatory diagram illustrating operation of the primary-side detection circuit according to the modification shown in FIG. 4A.

In this case, as shown in FIG. 4B, the magnetic flux ΦL1 in the vicinity of the primary-side coil 112 increases as the position of the central axis CX2 of the secondary-side coil 212 on the power reception side becomes closer to the position Pc1 of the central axis CX1 of the primary-side coil 112 on the arrangement surface, and decreases as the position of the central axis CX2 of the secondary-side coil 212 becomes farther from the position Pc1 of the central axis CX1 of the primary-side coil 112. In the primary-side detection circuit 120, the detection signal Sd is switched from the inactive state to the active state in response to detection by the detection circuit 124 of the fact that the magnetic flux ΦL1 has become higher than or equal to a threshold value Φth. In this modification of the contactless power supply system as well, the power transmission apparatus 100 can detect, without performing communication with the power reception apparatus 200, the fact that the power reception apparatus 200 is in a state capable of receiving electric power from the power transmission apparatus 100. Consequently, supply of electric power from the power transmission apparatus 100 to the power reception apparatus 200 can be automatically performed without performing a handshake through communication between the power transmission apparatus 100 and the power reception apparatus 200.

Second Embodiment

Figure 5:
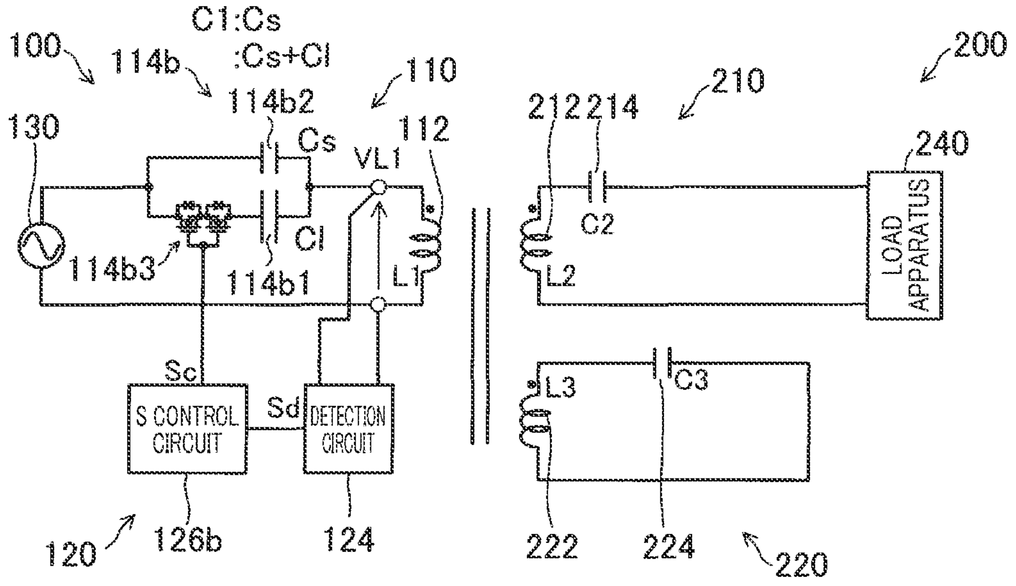
FIG. 5 is a schematic configuration diagram of a contactless power supply system according to a second embodiment.

In the first embodiment, a variable capacitor element whose capacitance changes according to the control voltage Vc is employed as the primary-side capacitor 114; and the primary-side capacitor 114 constitutes the impedance varying element. However, the impedance varying element may alternatively be constituted of a primary-side capacitor **114*b* as shown in FIG. 5**.

The primary-side capacitor **114*b* is a variable capacitor unit that is constituted of a first capacitor 114*b*1, a switch 114*b*3 connected in series with the first capacitor 114*b*1, and a second capacitor 114*b*2 connected in parallel with the first capacitor 114*b*1 and the switch 114*b*3. The capacitance Cs of the second capacitor 114*b*2 is lower than the capacitance C1 of the first capacitor 114*b*1. In addition, the switch 114*b*3** may be configured with, for example, a bidirectional switch circuit.

The first capacitor **114*b*1 is connected in parallel with the second capacitor 114*b*2 when the switch 114*b*3 is in an on-state, and released when the switch 114*b*3 is turned off. Therefore, the capacitance C1 of the primary-side capacitor 114*b* is represented by the capacitance Cs of the second capacitor 114*b*2 when the switch 114*b*3 is in an off-state, and represented by the sum [C1+Cs] of the capacitance C1 of the first capacitor 114*b*1 and the capacitance Cs of the second capacitor 114*b*2 when the switch 114*b*3** is in the on-state. In addition, in the present embodiment, [C1+Cs] is set to the capacitance for electric power supply described in the first embodiment; and Cs is set to the capacitance for standby described in the first embodiment.

The primary-side detection circuit 120 includes an S control circuit 126*b* instead of the C control circuit 126 shown in FIG. 1. The S control circuit 126*b* outputs a switch signal Sc by which the switch 114*b*3 is turned on when the detection signal Sd is in the active state, and turned off when the detection signal Sd is in the inactive state. Consequently, when supplying electric power, the input impedance of the primary-side resonant circuit 110 can be reduced with the capacitance C1 of the primary-side capacitor 114*b* set to the capacitance for electric power supply; and when not supplying electric power, the input impedance of the primary-side resonant circuit 110 can be increased with the capacitance C1 of the primary-side capacitor 114*b* set to the capacitance for standby.

With the above configuration of the contactless power supply system according to the second embodiment, it is also possible to automatically perform, as described in the first embodiment, supply of electric power from the power transmission apparatus 100 to the power reception apparatus 200 without performing a handshake through communication between the power transmission apparatus 100 and the power reception apparatus 200. Moreover, the automatic supply of electric power from the power transmission apparatus 100 to the power reception apparatus 200 can be started faster than in the case of performing a handshake through communication.

Third Embodiment

Figure 6:
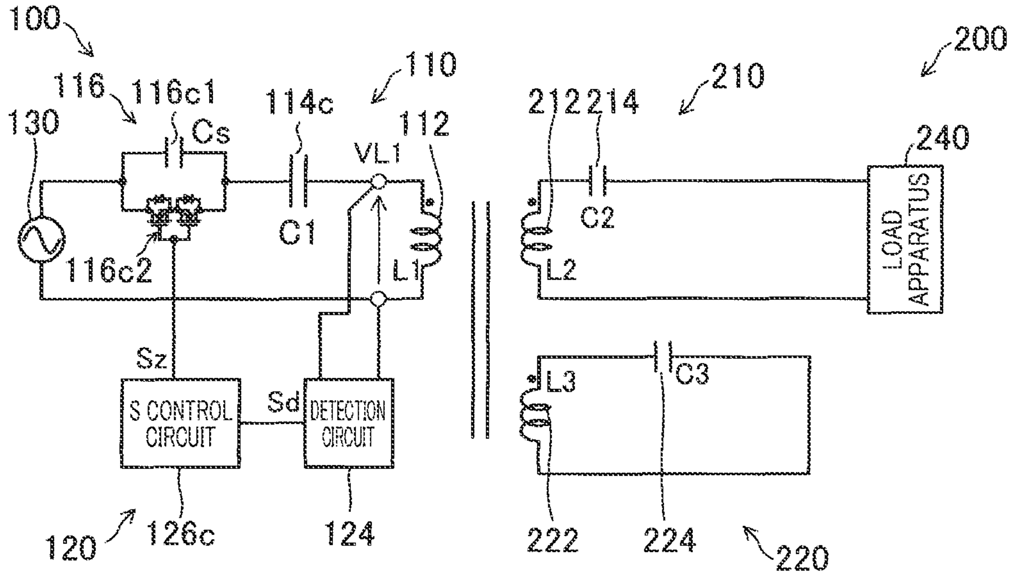
FIG. 6 is a schematic configuration diagram of a contactless power supply system according to a third embodiment.

In the first and second embodiments, the impedance varying element is constituted of the primary-side capacitor 114 or 114*b* of the primary-side resonant circuit 110 (see FIGS. 1 and 5). Alternatively, as shown in FIG. 6, the primary-side resonant circuit 110 may include a primary-side capacitor 114*c* having a constant capacitance and an additional impedance varying element 116. In addition, in the present embodiment, the capacitance C1 of the primary-side capacitor 114*c* is set to the capacitance for electric power supply described in the first embodiment.

The impedance varying element 116 is constituted of: an impedance varying capacitor 116*c*1 connected in series with the primary-side capacitor 114*c*; and a switch 116*c*2 for short-circuiting terminals of the impedance varying capacitor 116*c*1.

In the present embodiment, the primary-side detection circuit 120 includes an S control circuit 126*c* instead of the C control circuit 126 (see FIG. 1). The S control circuit 126*c* outputs a switch signal Sz by which the switch 116*c*2 is turned on when the detection signal Sd is in the active state, and turned off when the detection signal Sd is in the inactive state. Consequently, when supplying electric power, it is possible to cause the power supply current corresponding to the input impedance of the primary-side resonant circuit 110 to flow through the primary-side coil 112 by short-circuiting the impedance varying capacitor 116*c*1 and thereby setting the impedance of the impedance varying element 116 to zero. In contrast, when not supplying electric power, it is possible to cause the standby current corresponding to the impedance of the impedance varying element 116 to flow through the primary-side coil 112 by increasing the impedance of the impedance varying element 116 with the capacitance Cs of the impedance varying capacitor 116*c*1.

With the above configuration of the contactless power supply system according to the third embodiment, it is also possible to automatically perform, as described in the first and second embodiments, supply of electric power from the power transmission apparatus 100 to the power reception apparatus 200 without performing a handshake through communication between the power transmission apparatus 100 and the power reception apparatus 200. Moreover, the automatic supply of electric power from the power transmission apparatus 100 to the power reception apparatus 200 can be started faster than in the case of performing a handshake through communication.

Although the impedance varying element 116 has been described taking the configuration of employing the impedance varying capacitor 116*c*1 as an example, the impedance varying element 116 is not limited to the impedance varying capacitor 116*c*1, but may alternatively be any element whose impedance when the switch 116*c*2 is turned off has an amplitude corresponding to the standby current, such as a resistor, a reactor or the like.

In addition, in the case of the above-described impedance varying element 116 in which the impedance varying capacitor 116*c*1 is employed, the combination of the impedance varying element 116 and the primary-side capacitor 114*c* can be regarded as a variable capacitor unit constituting a primary-side capacitor, like the primary-side capacitor 114*b* (see FIG. 5) according to the second embodiment.

Fourth Embodiment

Figure 7:
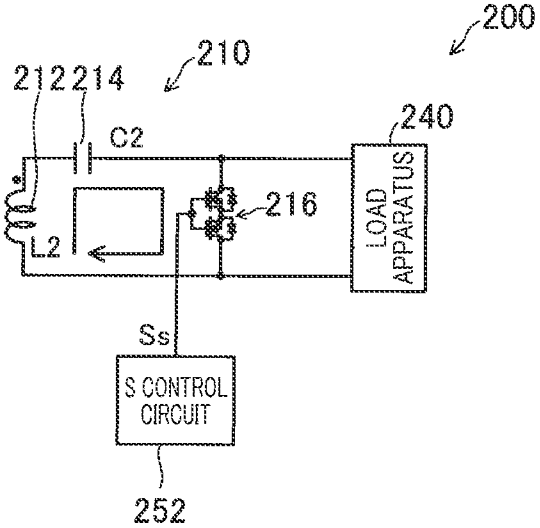
FIG. 7 is a schematic configuration diagram of a power reception apparatus of a contactless power supply system according to a fourth embodiment.

As in the power reception apparatus 200 shown in FIG. 7, the secondary-side resonant circuit 210 may be utilized as a magnetic flux amplifier circuit. In addition, although illustration of the power transmission apparatus is omitted from FIG. 7, the power transmission apparatus may have any of the configurations of the power transmission apparatuses 100 (see FIGS. 1 and 3 to 6) described in above embodiments.

The power reception apparatus 200 according to the fourth embodiment includes, instead of the magnetic flux amplifier circuit 220 (see FIG. 1), both a switch 216 that connects between output terminals of the secondary-side resonant circuit 210 and an S control circuit 252 that outputs a switch signal Ss for controlling the on/off state of the switch 216.

The switch 216 corresponds to a short-circuiting switch circuit that short-circuits the secondary-side coil 212 and the secondary-side capacitor 214, which are connected in series with each other, to form a closed circuit. In addition, the switch 216 may be configured with, for example, a bidirectional switch circuit.

The capacitance C2 of the secondary-side capacitor 214 of the secondary-side resonant circuit 210 is set to be $C2=1/(\omega0^2\cdot L2)$ with respect to the self-inductance L2 of the secondary-side coil 212, so that the operating frequency f0 becomes the resonant frequency of the secondary-side resonant circuit 210.

When the switch 216 is in the off-state, the secondary-side resonant circuit 210 is in a state capable of receiving electric power from the primary-side resonant circuit 110 of the power transmission apparatus 100. In contrast, when the switch 216 is in the on-state, the secondary-side resonant circuit 210 functions as a magnetic flux amplifier circuit that is configured with a short-circuited resonant circuit.

Therefore, in the power reception apparatus 200, when supply of electric power from the power transmission apparatus 100 is required, the switch 216 may be kept in the on-state for a given period of time, thereby having the secondary-side resonant circuit 210 operate as a magnetic flux amplifier circuit. In this case, as described in the first embodiment, the power transmission apparatus 100 can automatically detect the presence of the power reception apparatus 200 in a state capable of receiving electric power and operate to supply electric power to the power reception apparatus 200. Consequently, in the fourth embodiment, it is also possible to automatically perform supply of electric power from the power transmission apparatus 100 to the power reception apparatus 200 without performing a handshake through communication between the power transmission apparatus 100 and the power reception apparatus 200. Moreover, in the fourth embodiment, it becomes possible to omit, from the configuration of the power reception apparatus 200, the amplification coil 222 and the amplification capacitor 224 that together constitute the dedicated magnetic flux amplifier circuit 220 (see FIG. 1).

In addition, in the above example, the S control circuit 252 keeps the switch 216 in the on-state for a given period of time. However, the present disclosure is not limited to this example. Alternatively, the S control circuit 252 may turn off the switch 216 in response to detection that the coil current flowing through the secondary-side coil 212 of the secondary-side resonant circuit 210 operating as the short-circuited resonant circuit has increased and thereby the power transmission apparatus 100 has been brought into a state capable of supplying electric power.

Fifth Embodiment

Figure 8:
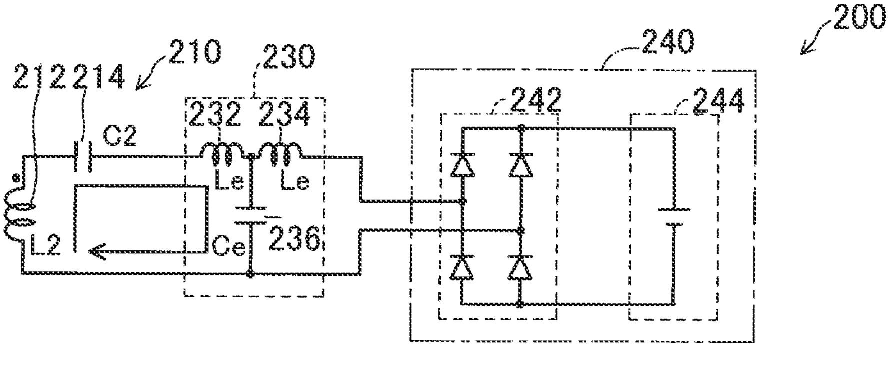
FIG. 8 is a schematic configuration diagram of a power reception apparatus of a contactless power supply system according to a fifth embodiment.

The power reception apparatus 200 shown in FIG. 8 includes an immittance filter 230. In this case, the secondary-side resonant circuit 210, an inductor 232 and a capacitor 236 may together operate, instead of the switch 216 (see FIG. 7), as the short-circuited resonant circuit; the inductor 232 and the capacitor 236 constitute the immittance filter 230. Here, the immittance filter 230 has a widely-used configuration to remove harmonic noise that may be included in the AC power received by the secondary-side resonant circuit 210. In addition, although illustration of the power transmission apparatus is omitted from FIG. 8 as from FIG. 7, the power transmission apparatus may have any of the configurations of the power transmission apparatuses 100 (see FIGS. 1 and 3 to 6) described in above embodiments.

In the power reception apparatus 200 according to the fifth embodiment, the load apparatus 240 includes a rectifier circuit 242 as a power reception circuit and a battery 244. The immittance filter 230 is provided between the secondary-side resonant circuit 210 and the rectifier circuit 242. The immittance filter 230 is a T-LCL immittance filter that is constituted of a pair of inductors 232 and 234 and a capacitor 236. The inductance Le of the inductors 232 and 234 and the capacitance Ce of the capacitor 236 are set so as to obtain immittance characteristics at the operating frequency f0, i.e., to satisfy $\omega0^2=1/(Le \cdot Ce)$.

In addition, the capacitance C2 of the secondary-side capacitor 214 of the secondary-side resonant circuit 210 is set to be $C2=1/(\omega0^2 \cdot L2)$ with respect to the self-inductance L2 of the secondary-side coil 212, so that the operating frequency f0 becomes the resonant frequency of the secondary-side resonant circuit 210.

The voltage between the output terminals of the rectifier circuit 242 is required to be higher than the voltage between the input terminals so as not to generate a forward voltage in the diodes. This may be achieved by, for example, the battery 244 having an amount of electric power storage greater than or equal to a value corresponding to the required voltage. In this case, the input impedance of the rectifier circuit 242 becomes high so that the state of the rectifier circuit 242 is substantially equivalent to that in the case of the rectifier circuit 242 being disconnected from the output terminals of the immittance filter 230. As a result, both the secondary-side coil 212 and the secondary-side capacitor 214 of the secondary-side resonant circuit 210 and both the inductor 232 and the capacitor 236 on the input side of the immittance filter 230 together form the short-circuited resonant circuit that resonates at the operating frequency fb, functioning as the magnetic flux amplifier circuit.

Therefore, when no electric power is supplied from the power transmission apparatus 100 to the power reception apparatus 200, e.g., when the power transmission apparatus 100 is in a standby state, the short-circuited resonant circuit configured with the secondary-side resonant circuit 210 and the immittance filter 230 of the power reception apparatus 200 operates as the magnetic flux amplifier circuit. Consequently, as described in the first embodiment, the power transmission apparatus 100 can automatically detect the presence of the power reception apparatus 200 in a state capable of receiving electric power and operate to supply electric power to the power reception apparatus 200.

As described above, in the fifth embodiment as well, supply of electric power from the power transmission apparatus 100 to the power reception apparatus 200 can be automatically performed without performing a handshake through communication between the power transmission apparatus 100 and the power reception apparatus 200. Moreover, as in the fifth embodiment, in the case of the power reception apparatus 200 including an immittance filter 230 that can be widely used to remove harmonic noise, the amplification coil 222 and the amplification capacitor 224 that constitute the dedicated magnetic flux amplifier circuit 220 (see FIG. 1) can be omitted, and the short-circuiting switch 216 (see FIG. 7) as in the fourth embodiment can also be omitted.

Figure 9:
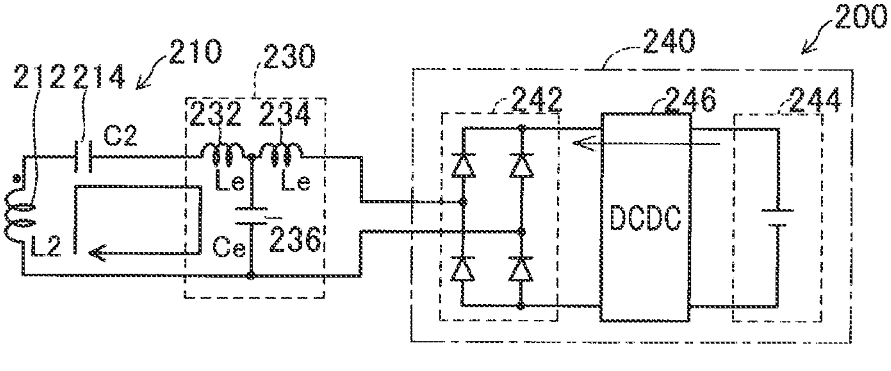
FIG. 9 is an explanatory diagram showing a modification of the power reception apparatus of the contactless power supply system according to the fifth embodiment.

In addition, as in the power reception apparatus 200 shown in FIG. 9, a DC-to-DC converter 246 may be provided between the rectifier circuit 242 and the battery 244. The DC-to-DC converter 246 converts the output voltage of the rectifier circuit 242 into a voltage within an allowable range of the input voltage of the battery 244. In this case, it is preferable to employ a bidirectional DC-to-DC converter as the DC-to-DC converter 246. Moreover, when the secondary-side resonant circuit 210 and the immittance filter 230 together form the short-circuited resonant circuit functioning as the magnetic flux amplifier circuit, the DC-to-DC converter 246 may operate to: convert the output voltage of the battery 244 into such a higher voltage than the voltage between the input terminals of the rectifier circuit 242 as not to generate a forward voltage in the diodes; and output the higher voltage to the rectifier circuit 242.

Figure 10:
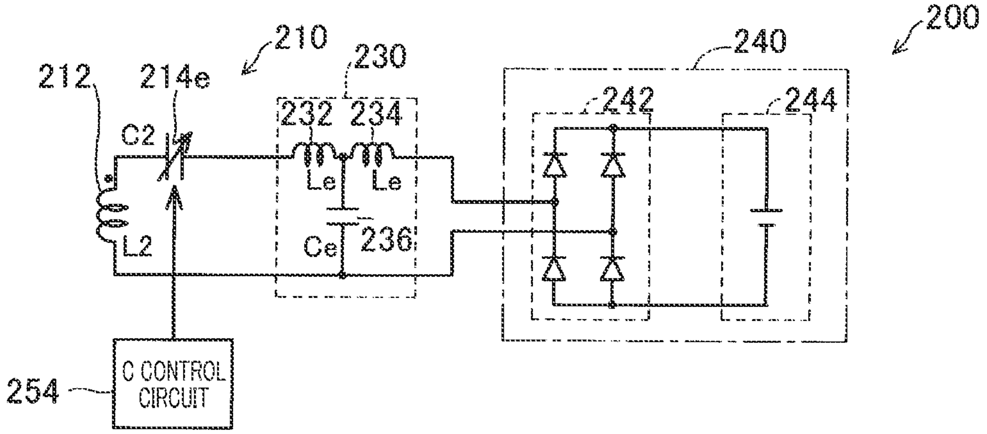
FIG. 10 is an explanatory diagram showing another modification of the power reception apparatus of the contactless power supply system according to the fifth embodiment.

Otherwise, as in the power reception apparatus 200 shown in FIG. 10, the secondary-side capacitor 214*e* of the secondary-side resonant circuit 210 may be constituted of a variable capacitor whose capacitance changes according to the control input applied thereto; and the capacitance C2 of the secondary-side capacitor 214*e* may be controlled by a C control circuit 254. In this case, when the secondary-side resonant circuit 210 and the immittance filter 230 together form the short-circuited resonant circuit functioning as the magnetic flux amplifier circuit, the capacitance C2 of the secondary-side capacitor 214*e* may be adjusted from the capacitance set when the secondary-side resonant circuit 210 is in a state capable of receiving electric power to the capacitance expressed by $C2=1/(\omega0^2 \cdot L2)$. Consequently, even when the capacitance C2 of the secondary-side capacitor 214*e* set when the secondary-side resonant circuit 210 is in a state capable of receiving electric power is different from different from $C2=1/(\omega 0^2 \cdot L2)$, the secondary-side resonant circuit 210 and the immittance filter 230 can still be used to form the short-circuited resonant circuit functioning as the magnetic flux amplifier circuit. Conversely, by offsetting the capacitance C2 from the capacitance expressed by expressed by $C2=1/(\omega 0^2 \cdot L2)$, it is possible to prevent the secondary-side resonant circuit 210 and the immittance filter 230 from together operating as the short-circuited resonant circuit. Consequently, it is possible to control, on the power reception apparatus 200 side, whether to allow the power reception apparatus 200 to receive the supplied electric power.

In addition, as the variable capacitor constituting the secondary-side capacitor 214*e*, a variable capacitor unit may be employed which includes a plurality of capacitors in the same manner as the primary-side capacitor 114*b* (see FIG. 5).

Sixth Embodiment

In the above-described first to fifth embodiments, the magnetic flux amplifier circuit is constituted of a short-circuited resonant circuit. However, as will be described below, the magnetic flux amplifier circuit may be constituted of a circuit that generates magnetic flux changing at the operating frequency f0.

Figure 11:
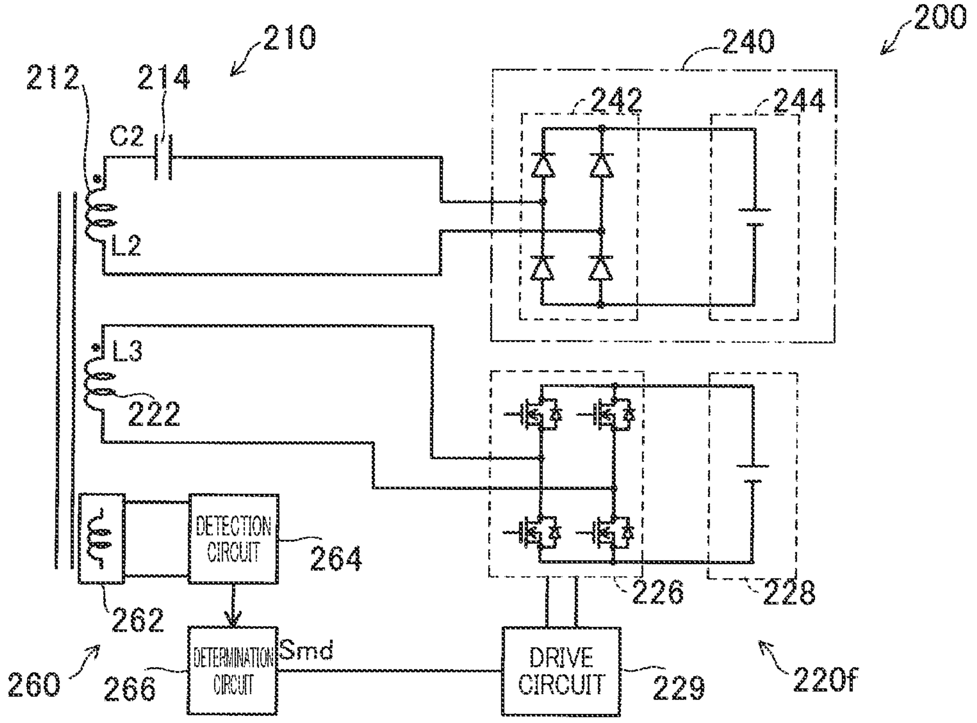
FIG. 11 is a schematic configuration diagram of a power reception apparatus of a contactless power supply system according to a sixth embodiment.

The power reception apparatus 200 shown in FIG. 11 includes a magnetic flux amplifier circuit 220*f* and a secondary-side detection circuit 260. It should be noted that FIG. 11 illustrates an exemplary configuration in which the load apparatus 240 includes a rectifier circuit 242 and a battery 244. In addition, although illustration of the power transmission apparatus is omitted from FIG. 11 as from FIG. 7, the power transmission apparatus may have any of the configurations of the power transmission apparatuses 100 (see FIGS. 1 and 3 to 6) described in above embodiments.

As described in the first embodiment, the capacitance C2 of the secondary-side capacitor 214 of the secondary-side resonant circuit 210 may be set, under various predetermined setting conditions and based on the self-inductance L2 of the secondary-side coil 212, the operating frequency f0 (or the operating angular frequency ω0), the coupling coefficients knm and the like, so that the AC power having the operating frequency f0 can be efficiently transferred between the primary-side resonant circuit 110 and the secondary-side resonant circuit 210.

The magnetic flux amplifier circuit 220*f* includes an amplification coil 222, a pulse generation circuit 226, a DC power supply 228 and a drive circuit 229. It should be noted that the DC power supply 228 may be omitted and the battery 244 may be used instead. The pulse generation circuit 226 is a circuit that converts, according to a drive signal supplied from the drive circuit 229, the DC voltage outputted from the DC power supply 228 into an AC voltage (or pulse voltage) having a frequency equal to the operating frequency f0 and applies the AC voltage to the amplification coil 222. The drive circuit 229 supplies the aforementioned drive signal to the pulse generation circuit 226 when a drive control signal Smd is in an active state, the drive control signal Smd is supplied from the secondary-side detection circuit 260 which will be described later. The amplification coil 222 generates magnetic flux according to AC current flowing therethrough due to the AC voltage applied thereto.

The secondary-side detection circuit 260 includes a magnetic flux detection element 262, a detection circuit 264 and a determination circuit 266. The magnetic flux detection element 262 is constituted of a magnetic sensor, a coil or the like. The detection circuit 264 detects, based on the change in an output value of the magnetic flux detection element 262, the magnetic flux generated by the standby current in the power transmission apparatus 100. The determination circuit 266 determines the presence or absence of the power transmission apparatus 100 based on the change in magnetic flux detected by the detection circuit 264. Specifically, when the magnetic flux detected by the detection circuit 264 has increased to become greater than or equal to a predetermined value, the determination circuit 266 determines that there is the power transmission apparatus 100 in a state capable of supplying electric power, and keeps the drive control signal Smd in the active state for a given period of time. Consequently, as described above, the magnetic flux amplifier circuit 220*f* is driven by the drive circuit 229 to generate magnetic flux that changes at the operating frequency M. As a result, as described in the first embodiment, upon the magnetic flux (or magnetic field) in the vicinity of the primary-side coil 112 being amplified, the power transmission apparatus 100 can detect the presence of the power reception apparatus 200 and supply electric power to the power reception apparatus 200.

With the above configuration of the contactless power supply system according to the sixth embodiment, it is also possible to automatically perform, as described in the first embodiment, supply of electric power from the power transmission apparatus 100 to the power reception apparatus 200 without performing a handshake through communication between the power transmission apparatus 100 and the power reception apparatus 200. Moreover, the automatic supply of electric power from the power transmission apparatus 100 to the power reception apparatus 200 can be started faster than in the case of performing a handshake through communication.

In addition, in the case of the magnetic flux amplifier circuit being constituted of a short-circuited resonant circuit as in the first embodiment, the amplification rate of the coil voltage of the primary-side coil generated by the magnetic flux generated by the magnetic flux amplifier circuit is $(k13^2 \cdot Q3)$ as described above. That is, the amplification rate depends on the coupling coefficient k13 between the primary-side coil 112 and the amplification coil 222 and the Q value Q3 of the short-circuited resonant circuit; therefore, there is a limit on the amplification rate. In contrast, the amplification rate of the coil voltage of the primary-side coil 112 by the magnetic flux generated by the magnetic flux amplifier circuit 220*f* according to the sixth embodiment can be changed depending on the magnitude of the AC current supplied from the pulse generation circuit 226 to the amplification coil 222. Therefore, it is possible to considerably increase the amplification rate of the coil voltage and thereby improve the stability of the detection of the coil voltage as compared with the case of the magnetic flux amplifier circuit being constituted of a short-circuited resonant circuit. The same applies to the case of detecting the coil current flowing through the primary-side coil, and to the case of detecting the magnetic flux (or magnetic field) in the vicinity of the primary-side coil.

In the above-described secondary-side detection circuit 260, the detection circuit 264 detects the change in the output value of the magnetic flux detection element 262. However, the detection circuit 264 may alternatively detect the change in the voltage between the terminals of the secondary-side coil 212 or the change in the electric current flowing through the secondary-side coil 212.

Moreover, in the above-described example, the drive control signal Smd is kept in the active state for a given period of time. However, the present disclosure is not limited to this example. Alternatively, the drive control signal Smd may be switched to an inactive state in response to detection of an increase in the coil current flowing through the secondary-side coil 212 of the secondary-side resonant circuit 210 or in the voltage between the terminals of the secondary-side coil 212 due to the power transmission apparatus 100 being brought into a state capable of supplying electric power.

When the pulse generation circuit 226 causes AC current to flow through the amplification coil 222, it is preferable for the ampere-turns of the amplification coil 222 to be less than or equal to the ampere-turns of the secondary-side coil 212. Specifically, it is preferable that the product of the electric current flowing through the amplification coil 222 and the number of turns of the winding of the amplification coil 222 is set to be less than or equal to the product of the electric current flowing through the secondary-side coil 212 when supplying electric power and the number of turns of the winding of the secondary-side coil 212. With such a configuration, by satisfying standard values of electromagnetic compatibility (EMC) when supplying electric power from the power transmission apparatus 100 to the power reception apparatus 200, standard values of electromagnetic compatibility during operation of the magnetic flux amplifier circuit 220*f* can also be satisfied, thereby facilitating the circuit design.

Seventh Embodiment

Figure 12:
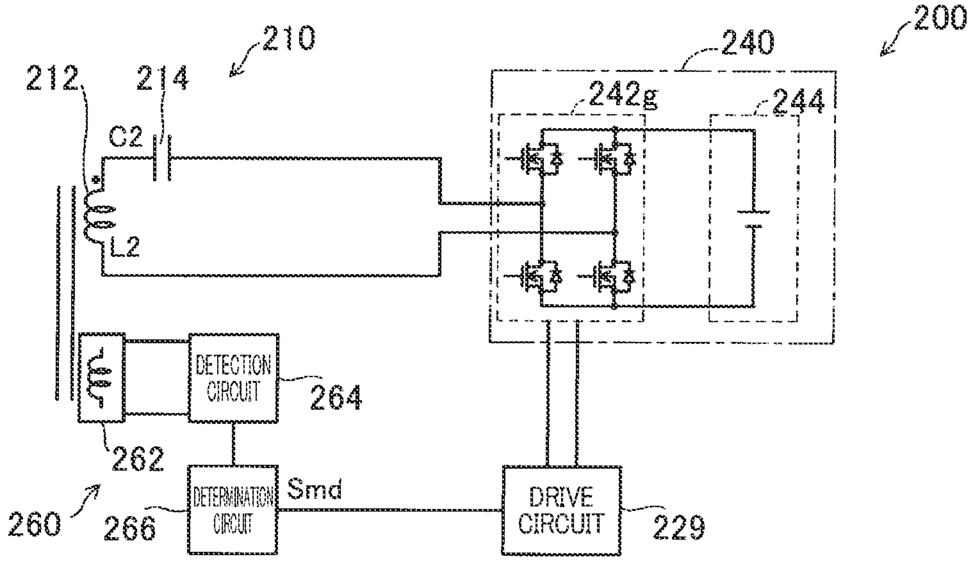
FIG. 12 is a schematic configuration diagram of a power reception apparatus of a contactless power supply system according to a seventh embodiment.

As in the power reception apparatus 200 shown in FIG. 12, the magnetic flux amplifier circuit may be constituted of the secondary-side resonant circuit 210, a rectifier circuit 242*g* and the battery 244. In addition, although illustration of the power transmission apparatus is omitted from FIG. 12 as from FIG. 11, the power transmission apparatus may have any of the configurations of the power transmission apparatuses 100 (see FIGS. 1 and 3 to 6) described in above embodiments.

As in the sixth embodiment, the capacitance C2 of the secondary-side capacitor 214 of the secondary-side resonant circuit 210 may be set, under various predetermined setting conditions and based on the self-inductance L2 of the secondary-side coil 212, the operating frequency f0 (or the operating angular frequency ω0), the coupling coefficients knm and the like, so that the AC power having the operating frequency f0 can be efficiently transferred between the primary-side resonant circuit 110 and the secondary-side resonant circuit 210.

The power reception apparatus 200 according to the seventh embodiment includes, instead of the magnetic flux amplifier circuit 220*f* (see FIG. 11), the rectifier circuit 242*g* that is implemented by a synchronous rectifier circuit.

When the drive control signal Smd is in the inactive state, the rectifier circuit 242*g* is driven by the drive circuit 229 to operate as an original synchronous rectifier circuit. In contrast, when the drive control signal Smd is in the active state, the rectifier circuit 242*g* is driven by the drive circuit 229 to operate in the same manner as the pulse generation circuit 226 (see FIG. 11); and the secondary-side resonant circuit 210, the rectifier circuit 242*g* and the battery 244 together operate as the magnetic flux amplifier circuit.

Hence, in the seventh embodiment as well, supply of electric power from the power transmission apparatus 100 to the power reception apparatus 200 can be automatically performed without performing a handshake through communication between the power transmission apparatus 100 and the power reception apparatus 200. Moreover, in the seventh embodiment, it becomes possible to omit the amplification coil 222, the pulse generation circuit 226 and the DC power supply 228 that together constitute the dedicated magnetic flux amplifier circuit 220*f* (see FIG. 11).

Eighth Embodiment

Figure 13:
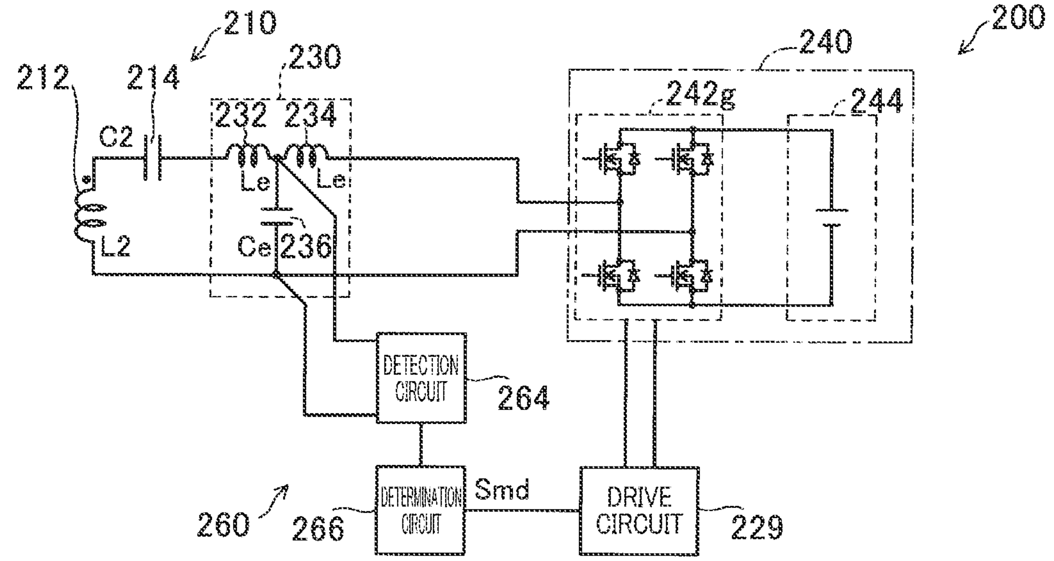
FIG. 13 is a schematic configuration diagram of a power reception apparatus of a contactless power supply system according to an eighth embodiment.

The power reception apparatus 200 shown in FIG. 13 includes the immittance filter 230. In this case, the magnetic flux detection element 262 (see FIG. 12) of the secondary-side detection circuit 260 may be omitted; and the voltage between the terminals of the capacitor 236 of the immittance filter 230 may be detected by the detection circuit 264. Moreover, although not shown in the drawings, the detection circuit 264 may alternatively detect the voltage between the output terminals of the immittance filter 230, i.e., the voltage between the input terminals of the rectifier circuit 242*g*.

Since no reactive current flows between the terminals of the capacitor 236 of the immittance filter 230 or between the output terminals of the immittance filter 230, the voltage between the terminals of the capacitor 236 or the voltage between the output terminals of the immittance filter 230 is lower than the voltage between the terminals of the secondary-side coil 212. Therefore, with the detection target being the voltage between the terminals of the capacitor 236, the detection can be performed at a lower voltage.

In addition, the voltage between the terminals of the secondary-side coil 212 is usually several hundred volts to several kilovolts when the supply of electric power is performed; therefore, it is necessary to take measures such as protection against very high voltages and the circuit for implementing the measures is complicated.

Moreover, when the load apparatus 240 is in a released state, an overvoltage may occur between the output terminals of the secondary-side resonant circuit 210. Therefore, it is necessary to short-circuit the output terminals of the immittance filter 230 for protection. In the case of the detection target being the voltage between the output terminals of the immittance filter 230, it is necessary to prepare a protection circuit such as a latch circuit. In contrast, in the case of the detection target being the voltage between the terminals of the capacitor 236, even if the output terminals of the immittance filter 230 are short-circuited, the key value and voltage at which the supply of electric power from the power transmission apparatus 100 is not stopped will not be significantly lowered; therefore, the protection circuit can be simplified.

In the above configuration, as described in the seventh embodiment, the capacitance C2 of the secondary-side capacitor 214 of the secondary-side resonant circuit 210 may be set, under various predetermined setting conditions and based on the self-inductance L2 of the secondary-side coil 212, the operating frequency fb (or the operating angular frequency ω0), the coupling coefficients knm and the like, so that the AC power having the operating frequency f0 can be efficiently transferred between the primary-side resonant circuit 110 and the secondary-side resonant circuit 210.

For example, the capacitance C2 of the secondary-side capacitor 214 may be set to be $C2=1/(\omega 0^2 \cdot L2)$ with respect to the self-inductance L2 of the secondary-side coil 212 so that the operating frequency f0 becomes the resonant frequency of the secondary-side resonant circuit 210. In this case, the coil current generated in the secondary-side coil 212 by the magnetic flux emanating from the primary-side coil 112 due to the standby current is amplified by Q3 times, where Q3 is the Q factor of the secondary-side resonant circuit 210. Accordingly, all of the voltage between the terminals of the secondary-side coil 212, the voltage between the terminals of the capacitor 236 of the immittance filter 230 and the voltage between the output terminals of the immittance filter 230 are amplified. Consequently, even if the magnetic flux generated by the standby current flowing through the primary-side coil 112 is minute, the capability of the detection by the secondary-side detection circuit 260 can be improved and thus the detection can be performed stably. In other words, the standby current in the power transmission apparatus 100 can be reduced; thus, the leakage magnetic flux and loss in the power transmission apparatus 100 can also be reduced.

Therefore, the secondary-side capacitor 214 may be implemented by, for example, a variable capacitor. Further, when not supplying electric power, the capacitance C2 of the secondary-side capacitor 214 may be set to be $C2=1/(\omega 0^2 \cdot L2)$ with respect to the self-inductance L2 of the secondary-side coil 212 so that the operating frequency f0 becomes the resonant frequency of the secondary-side resonant circuit 210. In contrast, when supplying electric power, the capacitance C2 of the secondary-side capacitor 214 may be set to the capacitance for electric power supply.

Ninth Embodiment

Figure 14:
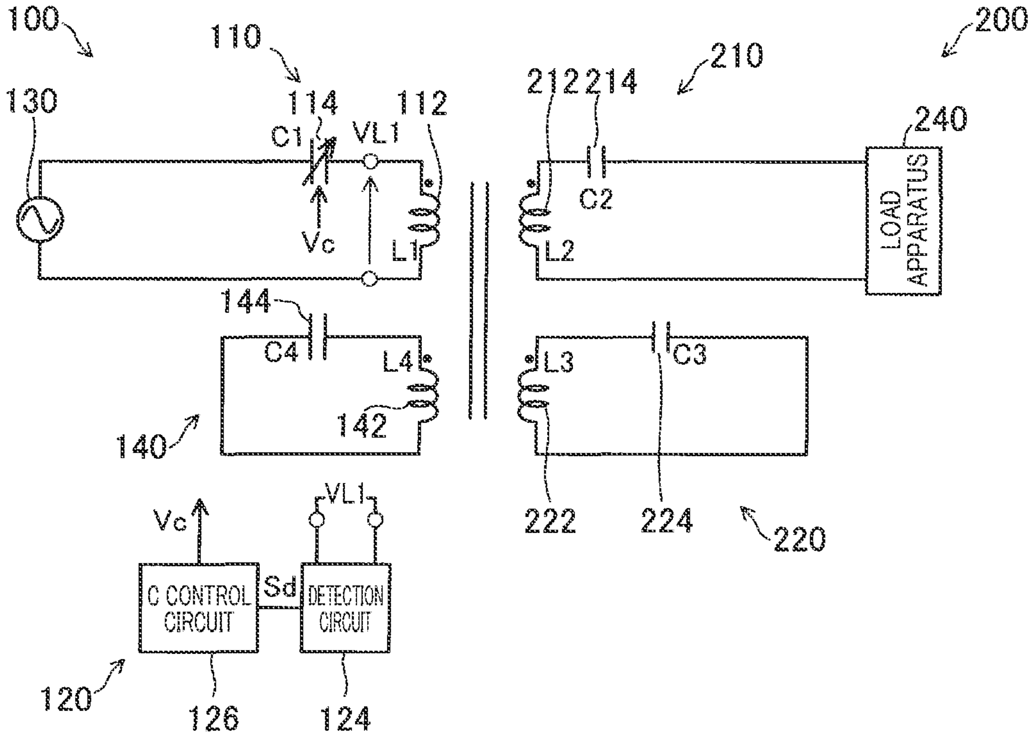
FIG. 14 is a schematic configuration diagram of a contactless power supply system according to a ninth embodiment.

As shown in FIG. 14, the power transmission apparatus 100 according to the first embodiment may be modified to further include a short-circuited resonant circuit 140.

Moreover, the capacitance C4 of the resonant capacitor 144 may be variable like the capacitance C1 of the primary-side capacitor 114. In this way, electric current flowing through the short-circuited resonant circuit 140 at the time of standby can be reduced; thus, the leakage magnetic flux and loss can also be reduced.

In the ninth embodiment, as in the first embodiment, supply of electric power from the power transmission apparatus 100 to the power reception apparatus 200 can be automatically performed without performing a handshake through communication between the power transmission apparatus 100 and the power reception apparatus 200. Moreover, the automatic supply of electric power from the power transmission apparatus 100 to the power reception apparatus 200 can be started faster than in the case of performing a handshake through communication.

Tenth Embodiment

In the above-described embodiments, the contactless power supply system includes a pair of a primary-side resonant circuit and a primary-side detection circuit. However, a contactless power supply system may include a plurality of power transmission units each consisting of a primary-side resonant circuit and a primary-side detection circuit.

Figure 15:
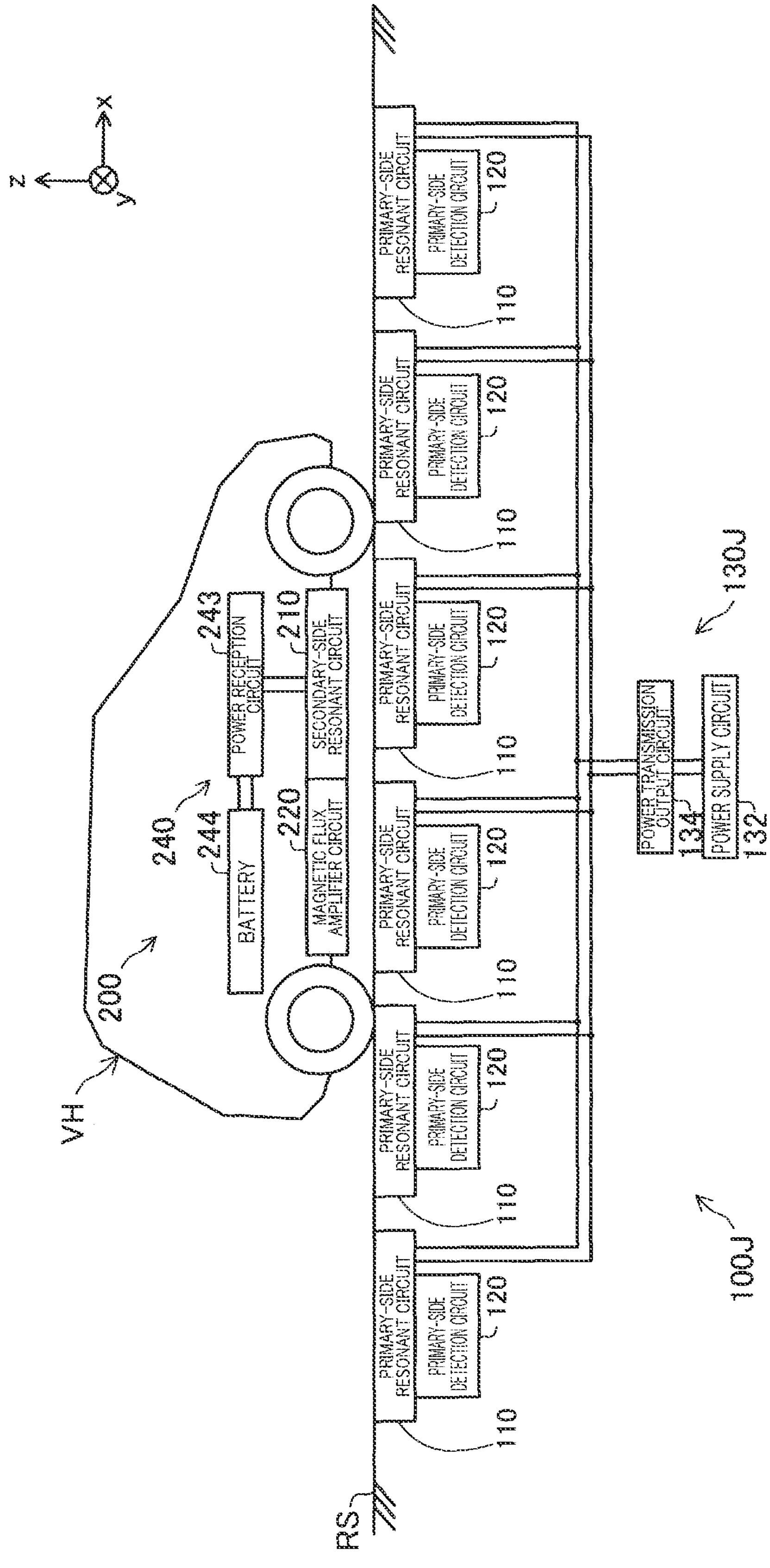
FIG. 15 is a schematic configuration diagram of a vehicular contactless power supply system according to a tenth embodiment.

For example, as shown in FIG. 15, a vehicular contactless power supply system includes: a power transmission apparatus 100J that includes a plurality of primary-side resonant circuits 110 and a plurality of primary-side detection circuits 120 (see FIG. 1); and a power reception apparatus 200 that includes a secondary-side resonant circuit 210, a magnetic flux amplifier circuit 220 and a load apparatus 240 (see FIG. 1). The vehicular contactless power supply system shown in FIG. 15 is a power supply system capable of supplying electric power from the power transmission apparatus 100J, which is laid along a course of a vehicle travel road RS, to the power reception apparatus 200 installed in a vehicle VH. The vehicle VH is configured as a vehicle that travels on electric power, such as an electric vehicle or a hybrid vehicle. In addition, in FIG. 15, the x-axis direction represents a traveling direction of the vehicle VH along a lane of the vehicle travel road RS; the y-axis direction represents a width direction of the vehicle travel road RS; and the z-axis direction represents a vertically-upward direction. It should be noted that the x-axis, y-axis and z-axis directions in other figures to be described later represent the same directions as those in FIG. 15.

The power transmission apparatus 100J includes a plurality of power transmission units each consisting of one of the primary-side resonant circuits 110 and one of the primary-side detection circuits 120. The power transmission apparatus 100J also includes an AC power supply apparatus 130J. The AC power supply apparatus 130J includes a power supply circuit 132 and a power transmission output circuit 134 for applying electric power to each of the primary-side resonant circuits 110.

The primary-side coils 112 (see FIG. 1) of the primary-side resonant circuits 110 are laid sequentially along the course of the vehicle travel road RS.

The power supply circuit 132 is a device that converts AC power from an external power supply into DC power. The power transmission output circuit 134 is a device that includes an inverter that converts the DC power supplied from the power supply circuit 132 into AC power having the operating frequency.

The power reception apparatus 200 installed in the vehicle VH includes the secondary-side resonant circuit 210 and the load apparatus 240 (see FIG. 1). The load apparatus 240 includes a power reception circuit 243 and a battery 244. The power reception circuit 243 may be constituted of a rectifier circuit, or of a rectifier circuit and a DC-to-DC converter.

A secondary-side coil 212 of the secondary-side resonant circuit 210 is installed at the bottom of the vehicle VH so as to face the primary-side coils 112 of the primary-side resonant circuits 110. Electric power induced in the secondary-side resonant circuit 210 is charged to the battery 244 via the power reception circuit 243, and further used to drive a motor (not shown) or the like.

As described in the first embodiment (see FIG. 1), in each of the power transmission units, the primary-side detection circuit 120 detects the presence or absence of the secondary-side coil 212 to which electric power is to be supplied from the primary-side coil 112 of the primary-side resonant circuit 110, i.e., detects the presence or absence of the vehicle VH in which the power reception apparatus 200 is installed. Moreover, upon detection of the presence of the vehicle VH, the primary-side detection circuit 120 changes the capacitance of the primary-side capacitor 114 (not shown) of the primary-side resonant circuit 110 from the capacitance for standby to the capacitance for electric power supply, thereby bringing the power transmission unit into a state capable of supplying electric power. Consequently, electric power is supplied from the power transmission unit to the power reception apparatus 200 installed in the vehicle VH. Furthermore, upon failing to detect the presence of the vehicle VH, the primary-side detection circuit 120 returns the capacitance of the primary-side capacitor 114 (not shown) of the primary-side resonant circuit 110 to the capacitance for standby.

With the above-described vehicular contactless power supply system according to the present embodiment, it is also possible to achieve the same advantageous effects as achievable with the contactless power supply systems according to the previous embodiments.

Figure 16:
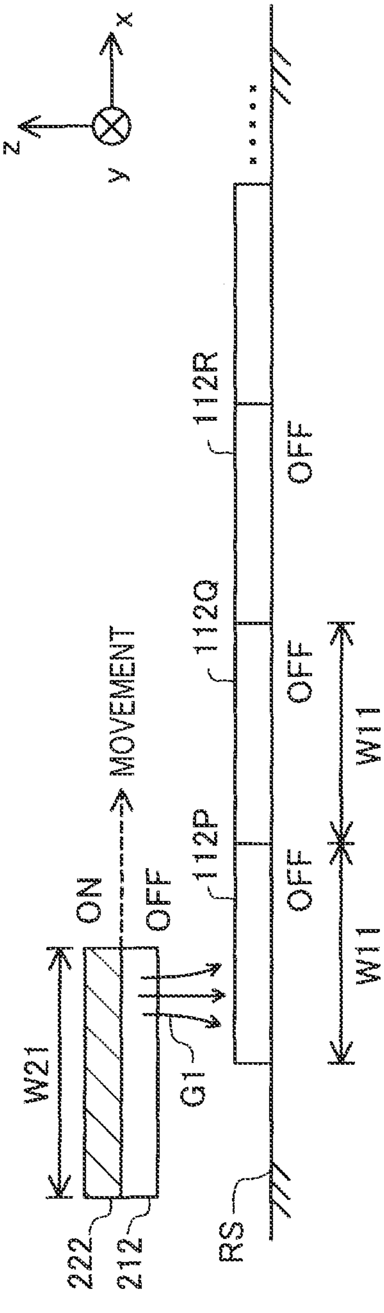
FIG. 16 is a first explanatory diagram illustrating the supply of electric power from a plurality of primary-side coils, which are arranged in a straight line, to a power reception apparatus.

As shown in FIG. 16, the primary-side coils 112P to 112R are continuously arranged in a straight line along the course of the vehicle travel road RS, i.e., along the x-axis direction representing the traveling direction of the vehicle VH. In addition, although the primary-side coils 112 are arranged in contact with each other in the example shown in FIG. 16 and FIGS. 17 to 19 to be described later, they are not necessarily arranged in contact with each other. That is, the primary-side coils 112 may alternatively be arranged apart from each other. However, for facilitating the supply of electric power from the primary-side coils 112 to the secondary-side coil 212 during traveling of the vehicle VH, it is preferable for the primary-side coils 112 to be arranged in contact with each other, or to be arranged apart from each other at intervals less than or equal to half the width of the primary-side coils 112 (or the radius of the primary-side coils 112 in the case of the primary-side coils 112 having a circular shape).

During traveling of the vehicle VH, when the amplification coil 222 and the secondary-side coil 212 approach the primary-side coil 112P, magnetic coupling occurs between the amplification coil 222 and the primary-side coil 112P and thus the amplification coil 222 generates induced magnetic flux G1. It should be noted that for the sake of facilitating understanding of the technology, those coils which are in the state of generating magnetic flux are hatched in FIG. 16 and FIGS. 17 and 18 to be described later. The magnetic flux G1 generated by the amplification coil 222 increases magnetic flux crossing the primary-side coil 112P, resulting in an increase in the coil voltage applied to the primary-side coil 112P. Upon detection by the detection circuit 124 of the increase in the primary-side coil voltage VL1, the primary-side detection circuit 120 switches the detection signal Sd to the active state. Consequently, the supply of electric power through the magnetic coupling between the primary-side coil 112P and the secondary-side coil 212 starts.

Figure 17:
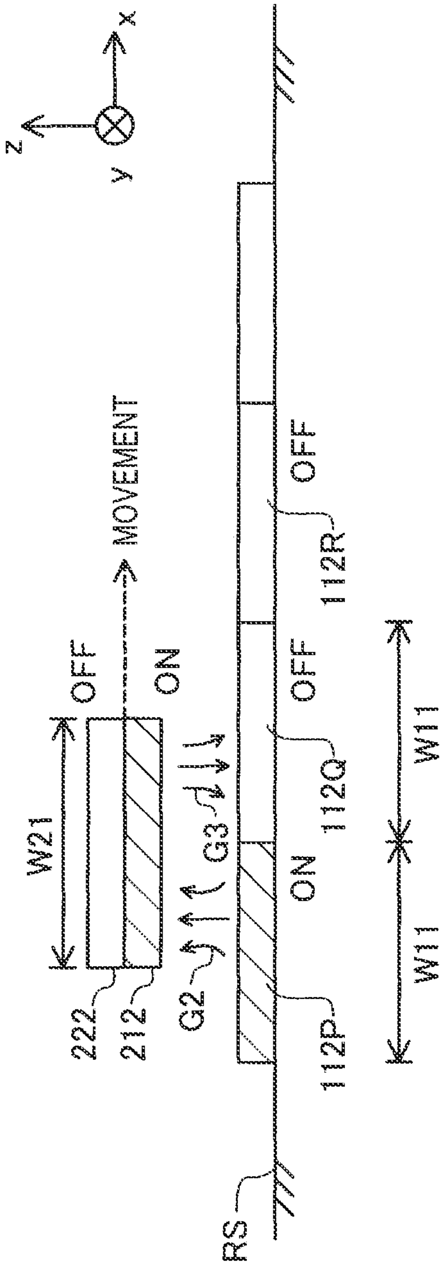
FIG. 17 is a second explanatory diagram illustrating the supply of electric power from the plurality of primary-side coils, which are arranged in a straight line, to the power reception apparatus.

As shown in FIG. 17, after the start of the supply of electric power through the magnetic coupling between the magnetic flux G2 of the primary-side coil 112P and the magnetic flux G3 of the secondary-side coil 212, a coil voltage is applied, by the magnetic flux G3 from the secondary-side coil 212, to the primary-side coil 112Q adjacent to the primary-side coil 112P. Upon detection by the detection circuit 124 of an increase in the voltage of the primary-side coil 112Q, the supply of electric power through the magnetic coupling between the primary-side coil 112Q and the secondary-side coil 212 starts. That is, in the contactless power supply system according to the present embodiment, after the start of the initial electric power supply by the primary-side coil 112P, the subsequent electric power supply by the primary-side coil 112Q adjacent to the primary-side coil 112P can be started without using the amplification coil 222.

In the present embodiment, as shown in FIG. 17, the width W21 of the secondary-side coil 212 along the traveling direction (i.e., the x-axis direction in FIG. 17) is set to be greater than the width W11 of each of the primary-side coils 112P to 112R along the traveling direction, i.e., along the vehicle travel road RS. Setting the width W21 of the secondary-side coil 212 to be greater than the width W11 of each of the primary-side coils 112P to 112R, a wide overlapping area between the primary-side coils 112 and the secondary-side coil 212 can be secured. Therefore, the detection circuit 124 corresponding to the primary-side coil 112Q adjacent to the primary-side coil 112P can easily detect the magnetic flux G3 of the secondary-side coil 212 generated during the supply of electric power by the primary-side coil 112P. Consequently, the primary-side coil 112Q can be switched from the state of no electric power supply to the state of electric power supply at an early stage.

Figure 18:
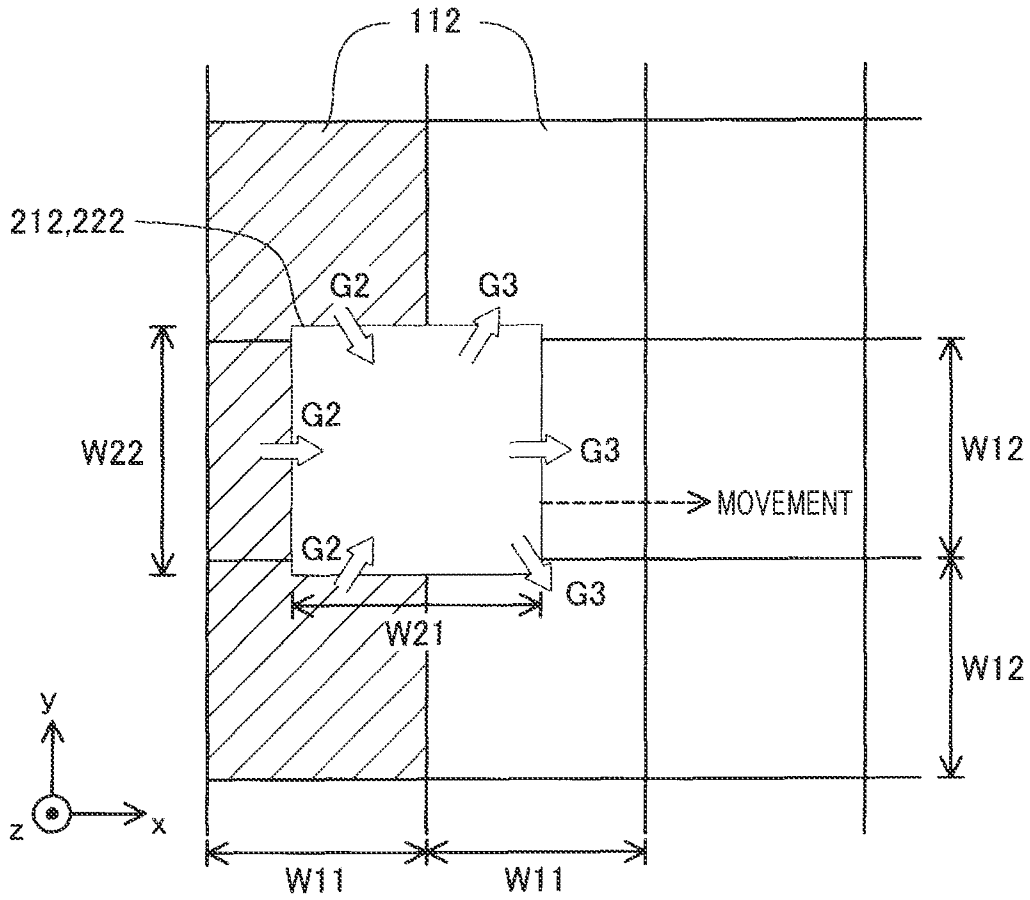
FIG. 18 is an explanatory diagram illustrating the supply of electric power from a plurality of primary-side coils, which are arranged two-dimensionally, to a power reception apparatus.

The arrangement of the primary-side coils 112 is not limited to the arrangement in a straight line along a given direction. For example, as shown in FIG. 18, the primary-side coils 112 may alternatively be arranged two-dimensionally in both the traveling direction of the secondary-side coil 212 (i.e., the x-axis direction in FIG. 18) and an intersecting direction that intersects the traveling direction of the secondary-side coil 212 (i.e., the y-axis direction in FIG. 18). In this case, it is preferable for the widths of the secondary-side coil 212 to be set to be greater than the widths of each of the primary-side coils 112 in both the x-axis direction and the y-axis direction. In the example shown FIG. 18, the width W22 of the secondary-side coil 212 in the y-axis direction is set to be greater than the width W12 of each of the primary-side coils 112 in the y-axis direction. With the above configuration, when the traveling direction of the secondary-side coil 212 located above the two-dimensionally-arranged primary-side coils 112 is switched between different directions, it is possible to switch the adjacent primary-side coils 112 in each of the different directions from the state of no electric power supply to the state of electric power supply at an early stage.

In addition, although the vehicular contactless power supply system has been described above based on the contactless power supply system according to the first embodiment, the vehicular contactless power supply system is not limited to the contactless power supply system according to the first embodiment; instead, the contactless power supply system according to any one of the above-described embodiments other than the first embodiment can also be applied to the vehicular contactless power supply system.

Eleventh Embodiment

Figure 19:
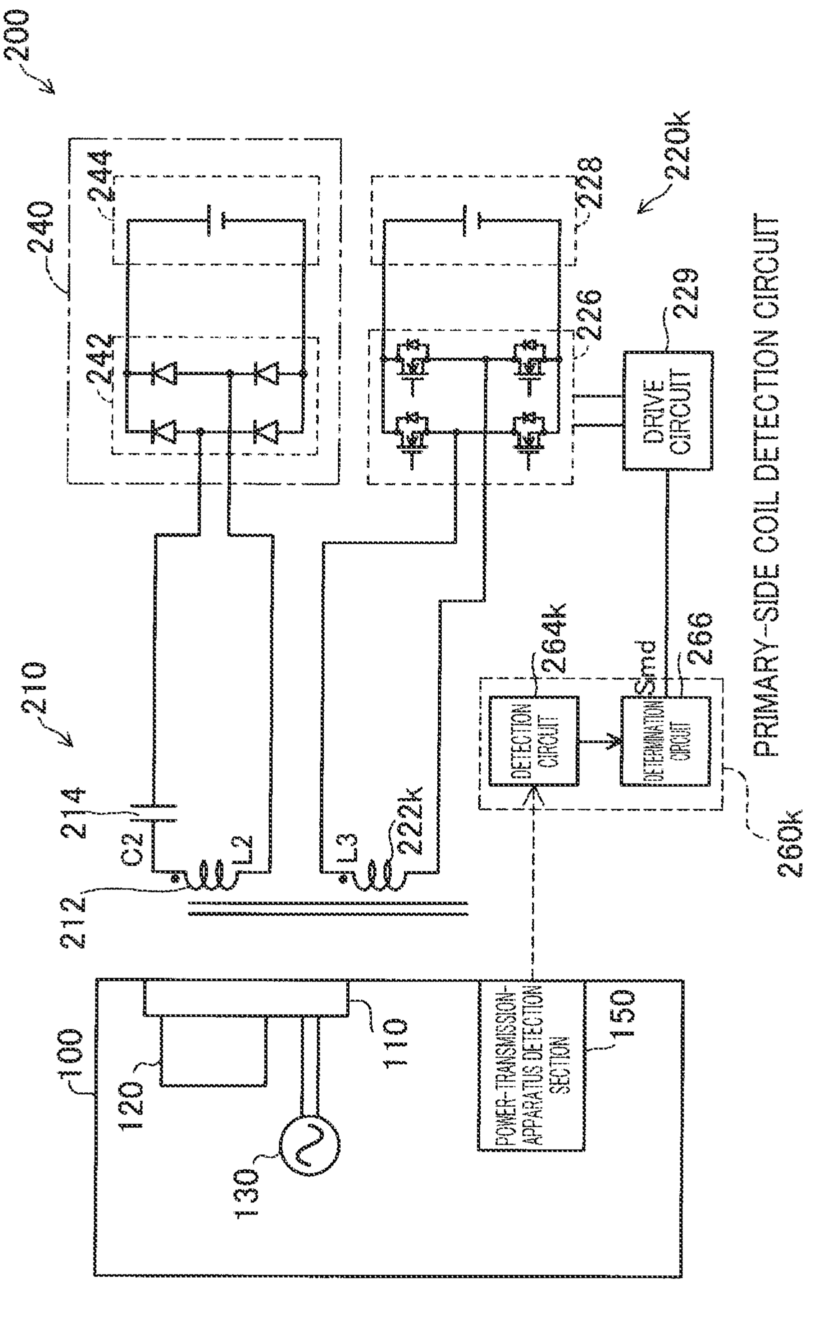
FIG. 19 is a schematic configuration diagram of a contactless power supply system according to an eleventh embodiment.

In the above-described sixth embodiment, as shown in FIG. 11, there is illustrated an example in which the power reception apparatus 200 includes: the magnetic flux amplifier circuit 220*f* that generates magnetic flux changing at the operating frequency f0; and the secondary-side detection circuit 260 that determines the presence or absence of the power transmission apparatus 100 based on the change in the magnetic flux generated by the standby current in the power transmission apparatus 100. Alternatively, as shown in FIG. 19, the power reception apparatus 200 may include an activation circuit 220*k* instead of the magnetic flux amplifier circuit 220*f*, and may include a power-transmission-apparatus detecting unit 260*k* instead of the secondary-side detection circuit 260. The power reception apparatus 200 according to the present embodiment determines the presence or absence of the power transmission apparatus 100 by detecting a power-transmission-apparatus detection section 150 provided on the power transmission side.

The circuit configuration of the activation circuit 220*k* is identical to the circuit configuration of the magnetic flux amplifier circuit 220*f* illustrated in the sixth embodiment, except that in the activation circuit 220*k*, the amplification coil 222 is replaced with an activation coil 222*k* having a different function from the amplification coil 222. The power-transmission-apparatus detecting unit 260*k* detects the primary-side coil 112 or the power-transmission-apparatus detection section 150 provided near the primary-side coil 112. The configuration of the power transmission apparatus 100 according to the present embodiment is identical to the configuration of the power transmission apparatus 100 illustrated in the sixth embodiment, except that the power transmission apparatus 100 according to the present embodiment further includes the power-transmission-apparatus detection section 150.

In the present embodiment, the power-transmission-apparatus detection section 150 is a two-dimensional code displayed on the surface of the vehicle travel road RS; and the power-transmission-apparatus detecting unit 260*k* includes a two-dimensional-code reader capable of reading the two-dimensional code. As the two-dimensional code, various two-dimensional codes, such as a QR (registered trademark) code, micro QR code, iQR code or PDF417 code, may be employed. For example, when the power-transmission-apparatus detection section 150 is implemented by a QR code, in the power-transmission-apparatus detecting unit 260*k*, a detection unit 264*k*, which is constituted of an imaging unit capable of detecting the QR code, detects the QR code; and the determination circuit 266 determines the presence or absence of the power transmission apparatus 100 based on the detection result of the detection unit 264*k*. With the above configuration, it is also possible to automatically perform supply of electric power from the power transmission apparatus 100 to the power reception apparatus 200 without performing a handshake through communication between the power transmission apparatus 100 and the power reception apparatus 200. It should be noted that the power-transmission-apparatus detection section 150 is not necessarily exposed on the vehicle travel road RS, and may be disposed in the vehicle travel road RS such that it can be recognized by the power-transmission-apparatus detecting unit 260*k*.

In response to determination by the determination circuit 266 that there is the power transmission apparatus 100, the drive control signal Smd is set to the active state, thereby causing the drive circuit 229 to drive the activation circuit 220*k*. Consequently, in the activation circuit 220*k*, AC current is supplied from the pulse generation circuit 226 to the activation coil 222*f*, thereby enabling the activation coil 222*k* to generate magnetic flux changing at the operating frequency 10. As a result, as described in the first embodiment, the magnetic flux generated by the activation coil 222*k* increases magnetic flux crossing the primary-side coil 112 of the power transmission apparatus 100.

In the primary-side detection circuit 120, the detection signal Sd is switched from the inactive state to the active state in response to detection by the detection circuit 124 of the fact that the primary-side coil voltage VL1 has increased to become higher than or equal to the threshold value Ith. Further, in response to the detection signal Sd being switched to the active state, the capacitance C1 of the primary-side capacitor 114 is set by the C control circuit 126 to the state when supplying electric power, thereby bringing the power transmission apparatus 100 into a state capable of supplying electric power to the power reception apparatus 200. It should be noted that in the present embodiment, the primary-side coil 112 may have no standby current flowing therethrough when the detection signal Sd is in the inactive state. Hence, in the present embodiment as well, supply of electric power from the power transmission apparatus 100 to the power reception apparatus 200 can be automatically performed without performing a handshake through communication between the power transmission apparatus 100 and the power reception apparatus 200. Moreover, in the present embodiment, the power reception apparatus 200 can detect the power transmission apparatus 100 without having standby current flow through the power transmission apparatus 100. In addition, although the primary-side detection circuit 120 is configured to detect the change in the primary-side coil voltage VL1 in the present embodiment, the present disclosure is not limited to this configuration. For example, the primary-side detection circuit 120 may alternatively be configured to detect the change in the coil current flowing through the primary-side coil 112, or to detect the magnetic field (or magnetic flux) in the vicinity of the primary-side coil 112 which is changed by the activation circuit 220*k*.

In the present embodiment, the primary-side resonant circuit 110 may further include an impedance varying element for varying the input impedance of the primary-side resonant circuit 110. The impedance varying element may reduce, when the detected value of the primary-side detection circuit 120 is greater than or equal to a given value, the input impedance of the primary-side resonant circuit 110 to start the supply of electric power. Moreover, standby current may be used to allow the power reception apparatus 200 to more easily detect the power transmission apparatus 100.

In the present embodiment, a variable capacitor element whose capacitance changes according to the control voltage is employed as the primary-side capacitor 114; and the primary-side capacitor 114 constitutes the impedance varying element. However, the impedance varying element may alternatively be constituted of the primary-side capacitor 114*b* as shown in FIG. 5. Otherwise, the primary-side resonant circuit 110 may include a primary-side capacitor 114*c* having a constant capacitance and an additional impedance varying element 116.

Figure 20:
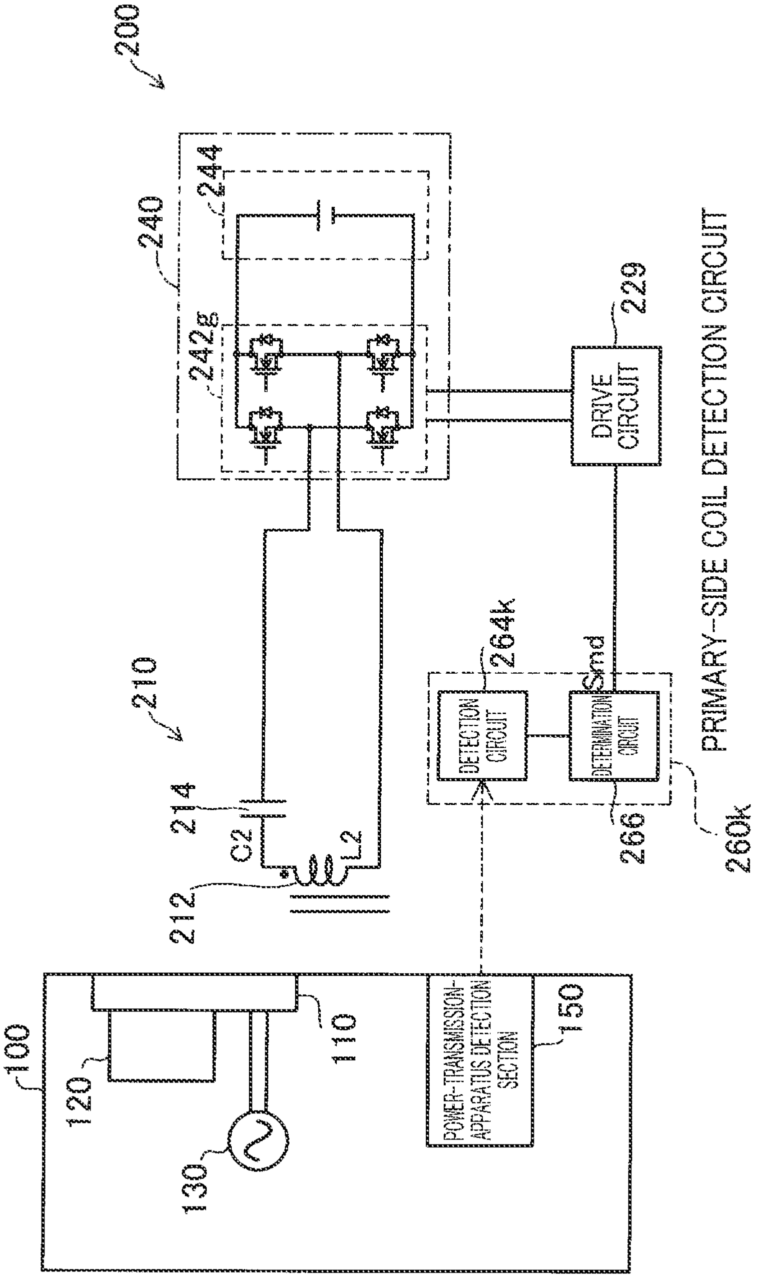
FIG. 20 is an explanatory diagram showing a modification of a power reception apparatus of the contactless power supply system according to the eleventh embodiment.

In the present embodiment, the activation circuit 220*k* includes the activation coil 222*k*, the pulse generation circuit 226 and the DC power supply 228. Alternatively, as shown in FIG. 20, the secondary-side coil 212 may be used as the activation coil 222*k*; and the rectifier circuit 242*g* and the battery 244 that are included in the load apparatus 240 may be used, instead of the pulse generation circuit 226 and the DC power supply 228, as the activation circuit 220*k*. The configuration of the power reception apparatus 200 shown in FIG. 20 is identical to the configuration of the power reception apparatus 200 illustrated in the seventh embodiment, except that the power-transmission-apparatus detecting unit 260*k* is employed instead of the secondary-side detection circuit 260; therefore, explanation thereof is omitted hereinafter. With the configuration shown in FIG. 20, the power reception apparatus 200 can be simplified by omitting the activation coil 222*k*, the pulse generation circuit 226 and the DC power supply 228 therefrom.

In the present embodiment, it is preferable that the product of the electric current flowing through the activation coil 222*k* and the number of turns of the winding of the activation coil 222*k* is set to be less than or equal to the product of the electric current flowing through the secondary-side coil 212 when supplying electric power and the number of turns of the winding of the secondary-side coil 212. With such a configuration, by satisfying the standard value of electromagnetic compatibility (EMC) when supplying electric power from the power transmission apparatus 100 to the power reception apparatus 200, the standard value of electromagnetic compatibility during operation of the activation coil 222*k* can also be satisfied, thereby facilitating the circuit design.

Other Embodiments (1) In the eleventh embodiment, the power-transmission-apparatus detection section 150 is a two-dimensional code displayed on the surface of the vehicle travel road RS; and the power-transmission-apparatus detecting unit 260*k* includes a two-dimensional-code reader capable of reading the two-dimensional code. As an alternative, the power-transmission-apparatus detection section 150 may be a magnetic marker; and the power-transmission-apparatus detecting unit 260*k* may include a magnetic-marker detector capable of detecting magnetic flux emanating from the magnetic marker, such as a Hall-effect sensor or a detection coil. Specifically, in this case, in the power-transmission-apparatus detecting unit 260*k*, the detection unit 264*k* constituted of the magnetic-marker detector detects the magnetic marker; and the determination circuit 266 determines the presence or absence of the power transmission apparatus 100 based on the detection result of the detection unit 264*k*. With the above configuration as well, supply of electric power from the power transmission apparatus 100 to the power reception apparatus 200 can be automatically performed without performing a handshake through communication between the power transmission apparatus 100 and the power reception apparatus 200.

As another alternative, the power-transmission-apparatus detection section 150 may be an RF tag used for an RFID (Radio Frequency Identifier), or an NFC tag or an IC chip used for NFC (Near Field Communication). RF tags are also called electronic tags, IC tags, wireless tags or RFID tags. In the case of the power-transmission-apparatus detection section 150 being an RF tag, the power-transmission-apparatus detecting unit 260*k* may employ an RF reader capable of acquiring information attached to the RF tag through wireless communication. RF readers include various devices capable of detecting RF tags, such as RF reader-writers and RF scanners. Otherwise, in the case of the power-transmission-apparatus detection section 150 being an NFC tag or an IC chip, the power-transmission-apparatus detecting unit 260*k* may employ an NFC reader capable of acquiring information attached to the NFC tag or the IC chip through wireless communication. NFC readers include various devices capable of detecting NFC tags, such as NFC reader-writers and NFC scanners. Specifically, in these cases, in the power-transmission-apparatus detecting unit 260*k*, the detection unit 264*k* constituted of the RF reader or the NFC reader detects the RF tag or the NFC tag; and the determination circuit 266 determines the presence or absence of the power transmission apparatus 100 based on the detection result of the detection unit 264*k*. With the above configuration as well, supply of electric power from the power transmission apparatus 100 to the power reception apparatus 200 can be automatically performed without performing a handshake through communication between the power transmission apparatus 100 and the power reception apparatus 200.

As yet another alternative, a part of the power transmission apparatus 100 which is applicable to image detection may be used as the power-transmission-apparatus detection section 150. For example, a part of the power transmission apparatus 100 which is applicable to image detection may be the outline of the primary-side coil 112, a tile for the vehicle travel road RS which includes the primary-side resonant circuit 110, or a figure/geometric pattern for detection which is provided on the surface of the power transmission apparatus 100. In this case, the power-transmission-apparatus detecting unit 260*k* may include, for example, a camera capable of capturing an image of that part of the power transmission apparatus 10. With the above configuration, the detection unit 264*k* of the power reception apparatus 200 can detect the power transmission apparatus 100 without increasing the parts count of the power transmission apparatus 100.

Specifically, in the above case, in the power-transmission-apparatus detecting unit 260*k*, the detection unit 264*k* constituted of the camera detects that part of the power transmission apparatus 100; and the determination circuit 266 determines the presence or absence of the power transmission apparatus 100 based on the detection result of the detection unit 264*k*. With the above configuration as well, supply of electric power from the power transmission apparatus 100 to the power reception apparatus 200 can be automatically performed without performing a handshake through communication between the power transmission apparatus 100 and the power reception apparatus 200.

Figure 21:
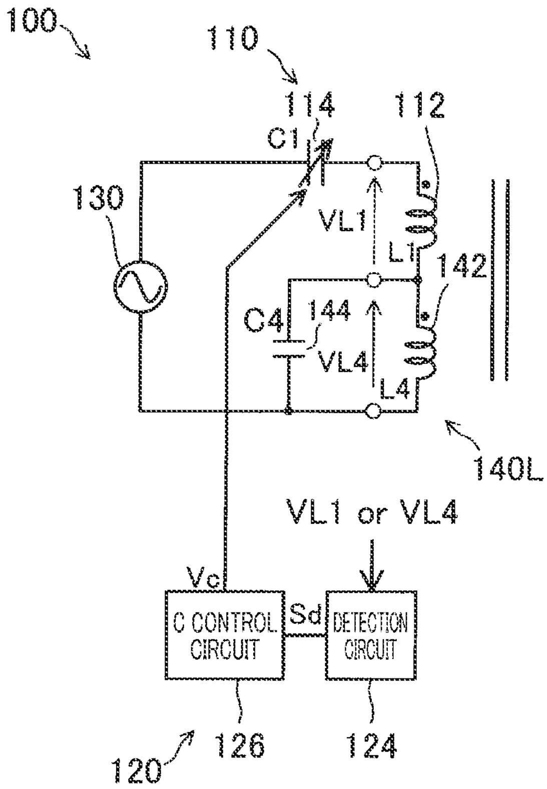
FIG. 21 is an explanatory diagram showing a modification of a power transmission apparatus of the contactless power supply system according to the ninth embodiment.

(2) In the above-described ninth embodiment, as shown in FIG. 14, the power transmission apparatus 100 of the first embodiment further includes the short-circuited circuit 140 that has the resonant coil 142 and the resonant capacitor 144 and is provided independently of the primary-side resonant circuit 110. Alternatively, as shown in FIG. 21, the power transmission apparatus 100 may include a connection-type resonant circuit 140L instead of the short-circuited resonant circuit 140. The connection-type resonant circuit 140L has a resonant coil 142 connected in series with the primary-side coil 112 of the primary-side resonant circuit 110, and a resonant capacitor 144 connected in parallel with the resonant coil 142. In addition, the resonant capacitor 144 may not be a variable capacitor.

In the above case, the detection circuit 124 can detect the presence or absence of the power reception apparatus 200 by detecting whether there is an increase in the primary-side coil voltage VL1 generated between the terminals of the primary-side coil 112 or an increase in the coil voltage VL4 generated between the terminals of the resonant coil 142. As an alternative, the detection circuit 124 may detect a change in the coil current flowing through the primary-side coil 112 instead of the primary-side coil voltage VL1 or a change in the coil current flowing through the resonant coil 142 instead of the coil voltage VL4. As another alternative, the detection circuit 124 may detect, using a magnetic flux detection element 123 such as a magnetic sensor or coil, a change in the magnetic field (or magnetic flux) in the vicinity of the primary-side coil 112 instead of the primary-side coil voltage VL1 or a change in the magnetic field (or magnetic flux) in the vicinity of the resonant coil 142 instead of the coil voltage VL4.

(3) In the present disclosure, a "resonant state" denotes a state in which the voltage and current generated in the primary-side coil 112 or in the secondary-side coil 212 becomes higher at a specific frequency than the voltage and current outputted from a power supply such as the AC power supply apparatus 130. Alternatively, it denotes a state in which the apparent power generated by the primary-side coil 112 or by the secondary-side coil 212 becomes higher at a specific frequency than the apparent power of the power supply. Alternatively, it denotes a state in which the phase difference between the voltage and current generated in the primary-side coil 112 or generated in the secondary-side coil 212 becomes less at a specific frequency than the phase difference between the voltage and current outputted from the power supply, more particularly becomes zero at a specific frequency. Alternatively, it denotes a state in which voltages in opposite directions are generated at a specific frequency in the primary-side coil 112 and the primary-side capacitor 114 connected in series with the primary-side coil 112 so that the imaginary component of the impedance as viewed from the power supply side is lowered. Furthermore, the voltage of the primary-side coil 112 and the voltage of the primary-side capacitor 114 may cancel each other out so that the imaginary component of the impedance as viewed from the power supply side becomes zero. The "specific frequency" in this case is the drive frequency of the inverter required for applying the AC voltage of the power supply.

(4) In the present disclosure, the "non-resonant state" is equivalent to a state in which no power reception coil exists, and denotes a state in which the magnetic flux density becomes lower than or equal to a safe magnetic flux density. Specifically, the non-resonant state denotes a state in which the magnetic flux density becomes lower than or equal to a reference value (such as ICNIRP) for human exposure that does not affect humans. In the non-resonant state, when there is no power reception coil, the magnetic flux emanating from the primary-side coil 112 may increase, and when there is no power reception side, the magnetic flux is radially generated and the region where the magnetic flux density exceeds the safe reference value may increase. Therefore, safe operation can be secured by placing the power transmission apparatus 100 to the resonant state only when there is the power reception apparatus 200 to which electric power is to be supplied.

The control unit and the control method described in the present disclosure may be realized by a dedicated computer that includes a processor, which is programmed to perform one or more functions embodied by a computer program, and a memory. As an alternative, the control unit and the control method described in the present disclosure may be realized by a dedicated computer that includes a processor configured with one or more dedicated hardware logic circuits. As another alternative, the control unit and the control method described in the present disclosure may be realized by one or more dedicated computers configured with a combination of a processor programmed to perform one or more functions, a memory and a processor configured with one or more dedicated hardware logic circuits. In addition, the computer program may be stored as computer-executable instructions in a computer-readable non-transitory tangible recording medium.

While the above particular embodiments and modifications have been shown and described, it will be understood by those skilled in the art that various further modifications, changes and improvements may be made without departing from the spirit of the present disclosure.

What is claimed is:

1. A contactless power supply system in which supply of electric power from a power transmission apparatus to a power reception apparatus is performed in a contactless manner, the contactless power supply system comprising:
- the power transmission apparatus including
  - a primary-side resonant circuit having a primary-side coil for power transmission and a primary-side capacitor, and
  - an AC power supply apparatus configured to supply AC power of a predetermined operating frequency to the primary-side resonant circuit; and
- the power reception apparatus including
  - a secondary-side resonant circuit having a secondary-side coil for power reception, which is to be magnetically coupled with the primary-side coil, and a secondary-side capacitor, and
  - a load apparatus configured to use electric power outputted from the secondary-side resonant circuit,
- wherein:
- the primary-side resonant circuit has an impedance varying element that increases, when the supply of electric power is stopped, an input impedance of the primary-side resonant circuit so as to have predetermined standby current flowing through the primary-side coil;
- the power reception apparatus further includes a magnetic flux amplifier circuit configured to amplify magnetic flux generated by the standby current flowing through the primary-side coil; and
- the power transmission apparatus further includes a primary-side detection circuit configured to detect a change in a voltage of the primary-side coil, a change in electric current flowing through the primary-side coil or a change in a magnetic field in the vicinity of the primary-side coil, each of the change in the voltage, the change in the electric current and the change in the magnetic field being caused by the magnetic flux amplified by the magnetic flux amplifier circuit.

2. The contactless power supply system as set forth in claim 1, wherein:
- when a detected value of the primary-side detection circuit has increased to become greater than or equal to a given value, the impedance varying element reduces the input impedance to start the supply of electric power.

3. The contactless power supply system as set forth in claim 1, wherein:
- the primary-side capacitor is constituted of a variable capacitor whose capacitance is variable; and
- the impedance varying element is constituted of the primary-side capacitor.

4. The contactless power supply system as set forth in claim 1, wherein:
- the magnetic flux amplifier circuit is constituted of a short-circuited resonant circuit that includes an amplification coil and an amplification capacitor.

5. The contactless power supply system as set forth in claim 4, wherein:
- the secondary-side resonant circuit includes a short-circuiting switch circuit that connects between terminals of the secondary-side resonant circuit; and
- upon the secondary-side coil and the secondary-side capacitor that are connected in series with each other being short-circuited by the short-circuiting switch circuit, the short-circuited resonant circuit is formed with the secondary-side coil and the secondary-side capacitor respectively serving as the amplification coil and the amplification capacitor.

6. The contactless power supply system as set forth in claim 5, wherein:
- the secondary-side capacitor is constituted of a variable capacitor whose capacitance is variable; and
- when having the short-circuited resonant circuit operate, the capacitance of the secondary-side capacitor is adjusted so that the secondary-side coil of the secondary-side resonant circuit and the secondary-side capacitor resonate at the operating frequency.

7. The contactless power supply system as set forth in claim 6, wherein:
- when preventing the short-circuited resonant circuit from operating, the capacitance of the secondary-side capacitor is offset from that set when the secondary-side coil of the secondary-side resonant circuit and the secondary-side capacitor resonate at the operating frequency.

8. The contactless power supply system as set forth in claim 4, wherein:

the load apparatus includes a rectifier circuit that converts AC power outputted from the secondary-side resonant circuit into DC power, and a battery that stores the DC power outputted from the rectifier circuit;

the power reception apparatus further includes an immittance filter that is provided between the secondary-side resonant circuit and the rectifier circuit; and the short-circuited resonant circuit is formed of both the secondary-side coil and the secondary-side capacitor of the secondary-side resonant circuit and both an inductor and a capacitor of the immittance filter.

9. The contactless power supply system as set forth in claim 8, wherein:

the power reception apparatus further includes a bidirectional DC-to-DC converter between the rectifier circuit and the battery; and when the secondary-side resonant circuit and the immittance filter together form the short-circuited resonant circuit, the bidirectional DC-to-DC converter operate to: convert an output voltage of the battery into a voltage higher than or equal to a predetermined value; and output the voltage higher than or equal to the predetermined value to the rectifier circuit.

10. The contactless power supply system as set forth in claim 8, wherein:

the secondary-side capacitor is constituted of a variable capacitor whose capacitance is variable; and when having the short-circuited resonant circuit operate, the capacitance of the secondary-side capacitor is adjusted so that the secondary-side coil of the secondary-side resonant circuit and the secondary-side capacitor resonate at the operating frequency.

11. The contactless power supply system as set forth in claim 10, wherein:

when preventing the short-circuited resonant circuit from operating, the capacitance of the secondary-side capacitor is offset from that set when the secondary-side coil of the secondary-side resonant circuit and the secondary-side capacitor resonate at the operating frequency.

12. The contactless power supply system as set forth in claim 1, wherein:

the magnetic flux amplifier circuit includes an amplification coil and a pulse generation circuit configured to supply AC current of the operating frequency to the amplification coil;

the power reception apparatus further includes a secondary-side detection circuit that detects the magnetic flux generated by the standby current flowing through the primary-side coil; and when a detected value of the secondary-side detection circuit has increased to become greater than or equal to a given value, the AC current is supplied from the pulse generation circuit to the amplification coil.

13. The contactless power supply system as set forth in claim 12, wherein:

the load apparatus includes a rectifier circuit that converts AC power outputted from the secondary-side resonant circuit into DC power, and a battery that stores the DC power outputted from the rectifier circuit;

the rectifier circuit is constituted of a synchronous rectifier circuit; and the magnetic flux amplifier circuit is formed with the secondary-side coil serving as the amplification coil and the rectifier circuit serving as the pulse generation circuit.

14. The contactless power supply system as set forth in claim 12, wherein:

the power reception apparatus further includes an immittance filter provided between the secondary-side resonant circuit and the load apparatus; and the secondary-side detection circuit detects, based on a voltage between output terminals of the immittance filter or a voltage between terminals of a capacitor of the immittance filter, the magnetic flux generated by the standby current flowing through the primary-side coil.

15. The contactless power supply system as set forth in claim 14, wherein:

both the secondary-side coil and the secondary-side capacitor of the secondary-side resonant circuit and both an inductor and the capacitor of the immittance filter together form a short-circuited resonant circuit.

16. The contactless power supply system as set forth in claim 12, wherein:

the pulse generation circuit supplies the AC current to the amplification coil so that the product of the electric current flowing through the amplification coil and the number of turns of a winding of the amplification coil is less than or equal to the product of the electric current flowing through the secondary-side coil during the supply of electric power and the number of turns of a winding of the secondary-side coil.

17. The contactless power supply system as set forth in claim 1, wherein:

the power transmission apparatus includes a plurality of primary-side coils; and the plurality of primary-side coils are arranged in a straight line along a given direction, or arranged two-dimensionally in both the given direction and an intersecting direction that intersects the given direction.

18. The contactless power supply system as set forth in claim 17, wherein;

a width of the secondary-side coil in the given direction is greater than a width of each of the plurality of primary-side coils in the given direction.

19. A contactless power supply system in which supply of electric power from a power transmission apparatus to a power reception apparatus is performed in a contactless manner, the contactless power supply system comprising:

the power transmission apparatus including a primary-side resonant circuit having a primary-side coil for power transmission and a primary-side capacitor, an AC power supply apparatus configured to supply AC power of a predetermined operating frequency to the primary-side resonant circuit, and a power-transmission-apparatus detection section provided at the primary-side coil or near the primary-side coil; and the power reception apparatus including a secondary-side resonant circuit having a secondary-side coil for power reception, which is to be magnetically coupled with the primary-side coil, and a secondary-side capacitor, a load apparatus configured to use electric power outputted from the secondary-side resonant circuit, an activation circuit having an activation coil and a pulse generation circuit configured to supply AC current of the operating frequency to the activation coil, and a power-transmission-apparatus detecting unit configured to detect the power-transmission-apparatus detection section, wherein:

in response to detection of the power-transmission-apparatus detection section by the power-transmission-apparatus detecting unit, the activation circuit supplies the AC current from the pulse generation circuit to the activation coil; and the power transmission apparatus further includes a primary-side detection circuit configured to detect a change in a voltage of the primary-side coil, a change in electric current flowing through the primary-side coil or a change in a magnetic field in the vicinity of the primary-side coil, each of the change in the voltage, the change in the electric current and the change in the magnetic field being caused by magnetic flux generated by the activation coil with the supplied AC current.

20. The contactless power supply system as set forth in claim 19, wherein:

the primary-side resonant circuit further has an impedance varying element configured to vary an input impedance of the primary-side resonant circuit; and when a detected value of the primary-side detection circuit is greater than or equal to a given value, the impedance varying element reduces the input impedance to start the supply of electric power.

21. The contactless power supply system as set forth in claim 20, wherein:

the impedance varying element is constituted of the primary-side capacitor; and the primary-side capacitor is constituted of a variable capacitor whose capacitance is variable.

22. The contactless power supply system as set forth in claim 19, wherein:

the load apparatus includes a rectifier circuit that converts AC power outputted from the secondary-side resonant circuit into DC power, and a battery that stores the DC power outputted from the rectifier circuit;

the rectifier circuit is constituted of a synchronous rectifier circuit; and the activation circuit is formed with the secondary-side coil serving as the activation coil and the rectifier circuit serving as the pulse generation circuit.

23. The contactless power supply system as set forth in claim 19, wherein:

the pulse generation circuit supplies the AC current to the activation coil so that the product of the electric current flowing through the activation coil and the number of turns of a winding of the activation coil is less than or equal to the product of the electric current flowing through the secondary-side coil during the supply of electric power and the number of turns of a winding of the secondary-side coil.

24. The contactless power supply system as set forth in claim 19, wherein:

the power-transmission-apparatus detection section is a two-dimensional code; and the power-transmission-apparatus detecting unit comprises a two-dimensional-code reader configure to read the two-dimensional code.

25. The contactless power supply system as set forth in claim 19, wherein:

the power-transmission-apparatus detection section is a magnetic marker; and the power-transmission-apparatus detecting unit comprises a magnetic-marker detector configured to detect magnetic flux emanating from the magnetic marker.

26. The contactless power supply system as set forth in claim 19, wherein:

the power-transmission-apparatus detection section is at least part of the power transmission apparatus; and the power-transmission-apparatus detecting unit comprises a camera configured to capture an image of the at least part of the power transmission apparatus.

27. The contactless power supply system as set forth in claim 19, wherein:

the power-transmission-apparatus detection section is an RF tag; and the power-transmission-apparatus detecting unit comprises an RF reader configured to detect the RF tag.

28. The contactless power supply system as set forth in claim 19, wherein:

the power transmission apparatus includes a plurality of primary-side coils; and the plurality of primary-side coils are arranged in a straight line along a given direction, or arranged two-dimensionally in both the given direction and an intersecting direction that intersects the given direction.

29. The contactless power supply system as set forth in claim 28, wherein:

a width of the secondary-side coil in the given direction is greater than a width of each of the plurality of primary-side coils in the given direction.

30. A power reception apparatus configured to receive, in a contactless manner, electric power transmitted from a power transmission apparatus, the power reception apparatus comprising:

a secondary-side resonant circuit that includes a secondary-side coil for power reception, which is to be magnetically coupled with a primary-side coil for power transmission included in the power transmission apparatus, and a secondary-side capacitor;

a load apparatus configured to use electric power outputted from the secondary-side resonant circuit; and a magnetic flux amplifier circuit configured to amplify magnetic flux generated by predetermined standby current flowing through the primary-side coil.

31. A power reception apparatus configured to receive, in a contactless manner, electric power transmitted from a power transmission apparatus, the power reception apparatus comprising:

a secondary-side resonant circuit that includes a secondary-side coil for power reception, which is to be magnetically coupled with a primary-side coil for power transmission included in the power transmission apparatus, and a secondary-side capacitor;

a load apparatus configured to use electric power outputted from the secondary-side resonant circuit;

an activation circuit that includes an activation coil and a pulse generation circuit configured to supply AC current of a predetermined operating frequency to the activation coil; and a power-transmission-apparatus detecting unit configured to (i) detect a power-transmission-apparatus detection section provided at the primary-side coil or near the primary-side coil and (ii) cause, upon detecting the power-transmission-apparatus detection section, the pulse generation circuit to supply the AC current to the activation coil.

* * * * *